United States Patent
Hanhart et al.

(10) Patent No.: US 12,501,081 B2
(45) Date of Patent: *Dec. 16, 2025

(54) HANDLING FACE DISCONTINUITIES IN 360-DEGREE VIDEO CODING

(71) Applicant: InterDigital VC Holdings, Inc., Wilmington, DE (US)

(72) Inventors: Philippe Hanhart, La Conversion (CH); Yuwen He, San Diego, CA (US); Yan Ye, San Diego, CA (US)

(73) Assignee: InterDigital VC Holdings, Inc., Wilmington, DE (US)

(*) Notice: Subject to any disclaimer, the term of this patent is extended or adjusted under 35 U.S.C. 154(b) by 81 days.

This patent is subject to a terminal disclaimer.

(21) Appl. No.: 17/876,708

(22) Filed: Jul. 29, 2022

(65) Prior Publication Data

US 2022/0377385 A1 Nov. 24, 2022

Related U.S. Application Data

(63) Continuation of application No. 16/648,163, filed as application No. PCT/US2018/051798 on Sep. 19, 2018, now Pat. No. 11,418,816.

(Continued)

(51) Int. Cl.
*H04N 19/82* (2014.01)
*H04N 19/176* (2014.01)
(Continued)

(52) U.S. Cl.
CPC ........... *H04N 19/82* (2014.11); *H04N 19/176* (2014.11); *H04N 19/184* (2014.11);
(Continued)

(58) Field of Classification Search
CPC .... H04N 19/82; H04N 19/176; H04N 19/184; H04N 19/597; H04N 19/513; H04N 19/593; H04N 19/86
See application file for complete search history.

(56) References Cited

U.S. PATENT DOCUMENTS 8,805,100 B2 8/2014 Ikai et al.
8,861,617 B2 10/2014 Chen et al.
(Continued)

FOREIGN PATENT DOCUMENTS

CN 102509350 A 6/2012
CN 102804776 A 11/2012
(Continued)

OTHER PUBLICATIONS

Feng et al., "Hardware Implementation of Deblocking Loop Filter in Video Decoder Chip", Computer Engineering, vol. 33, No. 7, Apr. 5, 2007, pp. 217-219.

(Continued)

*Primary Examiner* — Richard T Torrente
(74) *Attorney, Agent, or Firm* — Xiaoan Lu

(57) ABSTRACT

Systems, methods, and instrumentalities may be provided for discounting reconstructed samples and/or coding information from spatial neighbors across face discontinuities. Whether a current block is located at a face discontinuity may be determined. The face discontinuity may be a face boundary between two or more adjoining blocks that are not spherical neighbors. The coding availability of a neighboring block of the current block may be determined, e.g., based on whether the neighboring block is on the same side of the face discontinuity as the current block. For example, the neighboring block may be determined to be available for decoding the current block if it is on the same side of the face discontinuity as the current block, and unavailable if it is not on the same side of the face discontinuity. The neighboring block may be a spatial neighboring block or a temporal neighboring block.

12 Claims, 34 Drawing Sheets

Related U.S. Application Data

(60) Provisional application No. 62/628,752, filed on Feb. 9, 2018, provisional application No. 62/625,575, filed on Feb. 2, 2018, provisional application No. 62/622,551, filed on Jan. 26, 2018, provisional application No. 62/560,992, filed on Sep. 20, 2017.

(51) Int. Cl.
  *H04N 19/184* (2014.01)
  *H04N 19/597* (2014.01)
  *G06T 3/047* (2024.01)
  *G06T 3/067* (2024.01)
  *H04N 19/117* (2014.01)
  *H04N 19/70* (2014.01)

(52) U.S. Cl.
  CPC ............ *H04N 19/597* (2014.11); *G06T 3/047* (2024.01); *G06T 3/067* (2024.01); *H04N 19/117* (2014.11); *H04N 19/70* (2014.11)

(56) References Cited

U.S. PATENT DOCUMENTS

| | | | |
|---|---|---|---|
| 9,077,998 B2 | 7/2015 | Wang et al. | |
| 9,124,895 B2 | 9/2015 | Wang | |
| 9,237,359 B2 | 1/2016 | Huang et al. | |
| 9,264,739 B2 | 2/2016 | Park et al. | |
| 9,270,990 B2 | 2/2016 | Lee et al. | |
| 9,369,708 B2 | 6/2016 | Zhang et al. | |
| 9,473,784 B2 | 10/2016 | Mody et al. | |
| 9,503,702 B2 | 11/2016 | Chen et al. | |
| 9,510,021 B2 | 11/2016 | Cho et al. | |
| 9,516,306 B2 | 12/2016 | Zhang et al. | |
| 9,628,822 B2 | 4/2017 | Leontaris et al. | |
| 9,706,230 B2 | 7/2017 | Sharman | |
| 9,723,331 B2 | 8/2017 | Van Der Auwera et al. | |
| 9,736,454 B2 | 8/2017 | Hannuksela et al. | |
| 9,736,488 B2 | 8/2017 | Hoang | |
| 9,774,870 B2 | 9/2017 | Sasai et al. | |
| 9,854,252 B2 | 12/2017 | Mody et al. | |
| 9,912,966 B2 | 3/2018 | Hannuksela | |
| 9,942,557 B2 | 4/2018 | Carmel et al. | |
| 9,998,737 B2 | 6/2018 | Fu et al. | |
| 10,038,919 B2 | 7/2018 | Zhai et al. | |
| 10,057,570 B2 | 8/2018 | Ye et al. | |
| 10,091,519 B2 | 10/2018 | Kang et al. | |
| 10,097,844 B2 | 10/2018 | Saunders et al. | |
| 10,104,386 B2 | 10/2018 | Suehring et al. | |
| 10,136,150 B2 | 11/2018 | Ugur et al. | |
| 10,154,274 B2 | 12/2018 | Lainema et al. | |
| 10,205,950 B2 | 2/2019 | Terada et al. | |
| 10,225,567 B2 | 3/2019 | Yamamoto et al. | |
| 10,242,714 B2 | 3/2019 | Roy et al. | |
| 10,244,200 B2 | 3/2019 | Wozniak et al. | |
| 10,244,215 B2 | 3/2019 | Wozniak et al. | |
| 10,244,257 B2 | 3/2019 | Hannuksela et al. | |
| 10,244,265 B2 | 3/2019 | Norkin | |
| 10,250,897 B2 | 4/2019 | Deshpande et al. | |
| 10,306,246 B2 | 5/2019 | Chao et al. | |
| 10,389,999 B2 | 8/2019 | Wang et al. | |
| 10,397,615 B2 | 8/2019 | Norkin | |
| 10,432,928 B2 | 10/2019 | Li et al. | |
| 10,499,382 B2 | 12/2019 | Dinan | |
| 10,511,843 B2 | 12/2019 | Fu et al. | |
| 10,523,954 B2 | 12/2019 | Suehring et al. | |
| 10,531,111 B2 | 1/2020 | Li et al. | |
| 10,575,021 B2 | 2/2020 | Norkin | |
| 10,616,573 B2 | 4/2020 | Ugur et al. | |
| 10,743,034 B2 | 8/2020 | Xu et al. | |
| 10,750,170 B2 | 8/2020 | Kim et al. | |
| 10,863,182 B2 | 12/2020 | Hannuksela | |
| 10,880,535 B2 | 12/2020 | Oh et al. | |
| 11,153,562 B2 | 10/2021 | Zhang et al. | |
| 11,172,208 B2 | 11/2021 | Curcio et al. | |
| 11,290,751 B2 | 3/2022 | Gamei et al. | |
| 11,323,723 B2 | 5/2022 | Hannuksela et al. | |
| 2006/0268985 A1 | 11/2006 | Liang et al. | |
| 2013/0101031 A1 | 4/2013 | Van der Auwera et al. | |
| 2013/0107973 A1 | 5/2013 | Wang et al. | |
| 2013/0272624 A1 | 10/2013 | Budagavi | |
| 2013/0322253 A1 | 12/2013 | Jain et al. | |
| 2014/0078249 A1 | 3/2014 | Wang | |
| 2014/0168362 A1 | 6/2014 | Hannuksela et al. | |
| 2014/0282678 A1 | 9/2014 | Rodriguez et al. | |
| 2014/0286396 A1 | 9/2014 | Lee et al. | |
| 2014/0328413 A1 | 11/2014 | Esenlik et al. | |
| 2015/0003525 A1 | 1/2015 | Sasai et al. | |
| 2015/0016503 A1 | 1/2015 | Rapaka et al. | |
| 2015/0016506 A1 | 1/2015 | Fu et al. | |
| 2015/0016543 A1 | 1/2015 | Rapaka et al. | |
| 2015/0264404 A1 | 9/2015 | Hannuksela | |
| 2015/0271487 A1 | 9/2015 | Li et al. | |
| 2015/0271515 A1 | 9/2015 | Pang et al. | |
| 2015/0326886 A1 | 11/2015 | Chen et al. | |
| 2016/0012855 A1 | 1/2016 | Krishnan | |
| 2016/0112704 A1 | 4/2016 | Grange et al. | |
| 2016/0165248 A1 | 6/2016 | Lainema et al. | |
| 2017/0272758 A1* | 9/2017 | Lin ...................... | H04N 19/176 |
| 2017/0347109 A1* | 11/2017 | Hendry ................ | H04N 19/188 |
| 2017/0366808 A1* | 12/2017 | Lin ...................... | H04N 19/167 |
| 2018/0054613 A1* | 2/2018 | Lin ...................... | H04N 19/117 |
| 2018/0192074 A1 | 7/2018 | Shih et al. | |
| 2019/0200023 A1 | 6/2019 | Hanhart et al. | |
| 2019/0260990 A1 | 8/2019 | Lim et al. | |
| 2020/0322632 A1 | 10/2020 | Hanhart et al. | |

FOREIGN PATENT DOCUMENTS

| | | |
|---|---|---|
| CN | 103518375 A | 1/2014 |
| CN | 103947213 A | 7/2014 |
| CN | 104702963 A | 6/2015 |
| CN | 105049845 A | 11/2015 |
| CN | 105580373 A | 5/2016 |
| EP | 3025501 A1 | 6/2016 |
| EP | 3301914 A1 | 4/2018 |
| JP | 2014-171227 A | 9/2014 |
| JP | 2016-529782 A | 9/2016 |
| KR | 10-2014-0085541 A | 7/2014 |
| KR | 10-2016-0034998 A | 3/2016 |
| KR | 10-2018-0042098 A | 4/2018 |
| WO | 2012/119784 A1 | 9/2012 |
| WO | 2013/063455 A1 | 5/2013 |
| WO | 2013/155897 A1 | 10/2013 |
| WO | 2016/010668 A1 | 1/2016 |
| WO | 2016/064862 A1 | 4/2016 |
| WO | 2017/051072 A1 | 3/2017 |
| WO | 2017/142353 A1 | 8/2017 |
| WO | 2018/009746 A1 | 1/2018 |
| WO | 2018/170279 A1 | 9/2018 |
| WO | 2018/191224 A1 | 10/2018 |

OTHER PUBLICATIONS

Shih et al., "AHG8: Face-based Padding Scheme for Cube Projection", JVET-E0057, MediaTek Inc., Joint Video Exploration Team (JVET) of ITU-T SG 16 WP 3 and ISO/IEC JTC1/SC 29/WG 11, 5th Meeting: Geneva, CH, Jan. 12-20, 2017, pp. 1-5.
"VR Coaster", Available at <http://www.vrcoaster.com/>, 2014, pp. 1-7.
360LIB, Available at <https://jvet.hhi.fraunhofer.de/svn/svn_360Lib/>, Oct. 4, 2019, 1 page.
Abbas et al., "AHG8: New GoPro Test Sequences for Virtual Reality Video Coding", JVET-D0026, GoPro, Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-6.
Abbas et al., "AHG8: New Test Sequences for Spherical Video Coding from GoPro", JVET-G0147, GoPro, Joint Video Exploration Team (JVET) of ITU-T SG 16 WP 3 and ISO/IEC JTC 1/SC 29/WG 11, 7th Meeting: Torino, IT, Jul. 13-21, 2017, pp. 1-5.
Asbun et al., "AHG8: InterDigital Test Sequences for Virtual Reality Video Coding", JVET-D0039, InterDigital Communica-

(56) References Cited

OTHER PUBLICATIONS tions, Inc., Joint Video Exploration Team (JVET) of ITU-T SG 16 WP 3 and ISO/IEC JTC 1/SC 29/WG 11, 4th Meeting: Chengdu, CN, Oct. 15-21, 2016, 4 pages.
Asbun et al., "InterDigital Test Sequences for Virtual Reality Video Coding", JVET-G0055, InterDigital Communications, Inc., Joint Video Exploration Team (JVET) of ITU-T SG 16 WP 3 and ISO/IEC JTC 1/SC 29/WG 11, 7th Meeting: Torino, IT, Jul. 13-21, 2017, 4 pages.
Baroncini et al., "Results of the Joint Call for Evidence on Video Compression with Capability Beyond HEVC", JVET-G1004-V2, JVET, Joint Video Exploration Team (JVET) of ITU-T SG 16 WP 3 and ISO/IEC JTC 1/SC 29/WG 11, 7th Meeting: Torino, IT, Jul. 13-21, 2017, pp. 1-17.
Boyce et al., "JVET Common Test Conditions and Evaluation Procedures for 360° Video", JVET-E1030, Editors, Joint Video Exploration Team (JVET) of ITU-T SG 16 WP 3 and ISO/IEC JTC 1/SC 29/WG 11, 5th Meeting: Geneva, CH, Jan. 12-20, 2017, pp. 1-6.
Boyce et al., "JVET Common Test Conditions and Evaluation Procedures for 360° Video", JVET-F1030-V4, Editors, Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-7.
Budagavi et al., "360 Degrees Video Coding Using Region Adaptive Smoothing", 2015 IEEE International Conference on Image Processing (ICIP), Quebec City, QC, Canada, Sep. 27-30, 2015, pp. 750-754.
Chen et al., "Algorithm Description of Joint Exploration Test Model 5 (JEM 5)", JVET-E1001-V2, Editors, Joint Video Exploration Team (JVET) of ITU-T SG 16 WP 3 and ISO/IEC JTC 1/SC 29/WG 11, 5th Meeting: Geneva, CH, Jan. 12-20, 2017, 44 pages.
Chen et al., "Algorithm Description of Joint Exploration Test Model 7 (JEM 7)", JVET-G1001-V1, Editors, Joint Video Exploration Team (JVET) of ITU-T SG 16 WP 3 and ISO/IEC JTC 1/SC 29/WG 11, 7th Meeting: Torino, IT, Jul. 13-21, 2017, 50 pages.
Chen et al., "Further Improvements to HMKTA-1.0", VCEG-AZ07, Qualcomm Incorporated, ITU—Telecommunications Standardization Sector, Study Group 16 Question 6, Video Coding Experts Group (VCEG), 52nd Meeting, Warsaw, Poland, Jun. 19-26, 2015, 8 pages.
Choi et al., "Test Sequence Formats for Virtual Reality Video Coding", JVET-C0050, Samsung Electronics Co., Ltd., Joint Video Exploration Team (JVET) of ITU-T SG 16 WP 3 and ISO/IEC JTC 1/SC 29/WG 11, 3rd Meeting: Geneva, CH, May 26-Jun. 1, 2016, pp. 1-6.
Choi, Byeongdoo, "Technologies under Consideration for Omnidirectional Media Application Format", Systems Subgroup, ISO/IEC JTC1/SC29/WG11 N15946, San Diego, CA, US, Feb. 2016, 16 pages.
Coban et al., "AHG8: Adjusted Cubemap Projection for 360-Degree Video", JVET-F0025, Qualcomm Inc., Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-6.
Facebook360, "Facebook 360 Video", Available at <https://facebook360.fb.com/>, Apr. 4, 2019, pp. 1-5.
GitHub, "Facebook's Equirectangular to Cube Map Tool on GitHub", Transform 360, Available at <https://github.com/facebook/transform?files=1>, Nov. 9, 2018, pp. 1-3.
Google, "Bringing Pixels Front and Center in VR Video", Available at <https://www.blog.google/products/google-vr/bringing-pixels-front-and-center-vr-video/>, Mar. 14, 2017, pp. 1-8.
Google VR, "Google Cardboard", Available at <https://www.google.com/get/cardboard/>, Nov. 9, 2018, pp. 1-4.
Hanhart et al., "AHG8: High Level Syntax Extensions for Signaling of 360-Degree Video Information", JVET-D0093, InterDigital Communications Inc., Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-6.

Hanhart et al., "InterDigital's Response to the 360° Video Category in Joint Call for Evidence on Video Compression with Capability Beyond HEVC", JVET-G0024, InterDigital Communications Inc., Joint Video Exploration Team (JVET) of ITU-T SG 16 WP 3 and ISO/IEC JTC 1/SC 29/WG 11, 7th Meeting: Torino, IT, Jul. 13-21, 2017, pp. 1-16.
HTC, "HTC Vive", Available at <https://www.htcvive.com/us/>, Apr. 4, 2019, pp. 1-3.
ISO/IEC, "Requirements for OMAF", Requirements, ISO/IEC JTC1/SC29/WG11 N16143, San Diego, CA, US, Feb. 2016, 2 pages.
Kuzyakov et al., "Next-Generation Video Encoding Techniques for 360 Video and VR", Facebook Code, Available at <https://code.facebook.com/posts/1126354007399553/next-generation-video-encoding-techniques-for-360-video-and-vr/>, Jan. 21, 2016, pp. 1-6.
Lin et al., "AHG8: Compact Cube Layout with Tile Partition", JVET-D0104, MediaTek Inc., Joint Video Exploration Team (JVET) of ITU-T SG 16 WP 3 and ISO/IEC JTC 1/SC 29/WG11, 4th meeting: Chengdu, CN, Oct. 15-21, 2016, pp. 1-7.
Norkin et al., "Call for Test Materials for Future Video Coding Standardization", JVET-B1002, ITU-T Q6/16 Visual Coding (VCEG) and ISO/IEC JTC1/SC29/WG11 Coding of Moving Pictures and Audio (MPEG), Joint Video Exploration Team (JVET) of ITU-T SG 16 WP 3 and ISO/IEC JTC 1/SC 29/WG 11, 2nd Meeting: San Diego, USA, Feb. 20-26, 2016, pp. 1-4.
Oculus, "Oculus Rift", Available at <https://www.oculus.com/en-us/rift/>, Apr. 4, 2019, pp. 1-19.
Panusopone et al., "Unequal Weight Planar Prediction and Constrained PDPC", JVET-E0068-r1, ARRIS, Joint Video Exploration Team (JVET) of ITU-T SG 16 WP 3 and ISO/IEC JTC 1/SC 29/WG 11, 5th Meeting: Geneva, CH, Jan. 12-20, 2017, pp. 1-6.
Schwarz et al., "Tampere Pole Vaulting Sequence for Virtual Reality Video Coding", JVET-D0143, Nokia, Tampere University of Technology, Rakka Creative, Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-2.
Segall et al., "Draft Joint Call for Proposals on Video Compression with Capability Beyond HEVC", JVET-G1002, Editors, Joint Video Exploration Team (JVET) of ITU-T SG 16 WP 3 and ISO/IEC JTC 1/SC 29/WG 11, 7th Meeting: Torino, IT, Jul. 13-21, 2017, 28 pages.
Sullivan et al., "Meeting Notes of the 3rd Meeting of the Joint Video Exploration Team (JVET)", JVET-C1000, Responsible Coordinators, Joint Video Exploration Team (JVET) of ITU-T SG 16 WP 3 and ISO/IEC JTC 1/SC 29/WG 11, 3rd Meeting: Geneva, CH, May 26-Jun. 1, 2016, pp. 1-73.
Sun et al., "AHG8: WS-PSNR for 360 Video Objective Quality Evaluation", JVET-D0040, Zhejiang University, Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-5.
Sun et al., "Test Sequences for Virtual Reality Video Coding from LetinVR", JVET-G0053, Letin VR Digital Technology Co., Ltd., Joint Video Exploration Team (JVET) of ITU-T SG 16 WP 3 and ISO/IEC JTC 1/SC 29/WG 11, 7th Meeting: Torino, IT, Jul. 13-21, 2017, pp. 1-5.
Sun et al., "Test Sequences for Virtual Reality Video Coding from LetinVR", JVET-D0179, Letin VR Digital Technology Co., Ltd., Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-5.
Thomas et al., "5G and Future Media Consumption", TNO, ISO/IEC JTC1/SC29/WG11 MPEG2016/m37604, San Diego, CA, US, Feb. 2016, 10 pages.
Wien et al., "Joint Call for Evidence on Video Compression with Capability Beyond HEVC", JVET-F1002, Jvet, Joint Video Exploration Team (JVET), of ITU-T SG 16 WP 3 and ISO/IEC JTC 1/SC 29/WG 11, Hobart, AU, Mar. 31-Apr. 7, 2017, pp. 1-11.
Wien et al., "Preliminary Joint Call for Evidence on Video Compression with Capability Beyond HEVC", JVET-E1002, Jvet, Joint Video Exploration Team (JVET) of ITU-T SG 16 WP 3 and ISO/IEC JTC 1/SC 29/WG 11, 5th Meeting: Geneva, CH, Jan. 12-20, 2017, pp. 1-9.
Xiu et al., "Description of SDR, HDR and 360° Video Coding Technology Proposal by InterDigital Communications and Dolby

(56) References Cited

OTHER PUBLICATIONS

Laboratories", JVET-J0015-V1, InterDigital Communications, Inc., Dolby Laboratories, Inc., Joint Video Experts Team (JVET) of ITU-T SG 16 WP 3 and ISO/IEC JTC1/SC 29/WG 11, 10th Meeting: San Diego, US, Apr. 10-20, 2018, 82 pages.

Ye et al., "Algorithm Descriptions of Projection Format Conversion and Video Quality Metrics in 360Lib", JVET-E1003, Editors, Joint Video Exploration Team (JVET) of ITU-T SG 16 WP 3 and ISO/IEC JTC 1/SC 29/WG 11, 5th Meeting: Geneva, CH, Jan. 12-20, 2017, pp. 1-22.

Ye et al., "Algorithm Descriptions of Projection Format Conversion and Video Quality Metrics in 360Lib", JVET-F1003-V1, Editors, Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-33.

Youtube, "360 Video", Virtual Reality, Available at <https://www.youtube.com/channel/UCzuqhhs6NWbgTzMuM09WKDQ>, Oct. 4, 2019, pp. 1-3.

Yu et al., "A Framework to Evaluate Omnidirectional Video Coding Schemes", IEEE International Symposium on Mixed and Augmented Reality, Sep. 29-Oct. 3, 2015, pp. 31-36.

Yu et al., "Content Adaptive Representations of Omnidirectional Videos for Cinematic Virtual Reality", Proceedings of the 3rd International Workshop on Immersive Media Experiences, Brisbane, Australia, Oct. 30, 2015, pp. 1-6.

Zakharchenko et al., "Quality Metric for Spherical Panoramic Video", SPIE Optics and Photonics for Information Processing X, vol. 9970, Sep. 14, 2016.

\* cited by examiner

FIG. 16

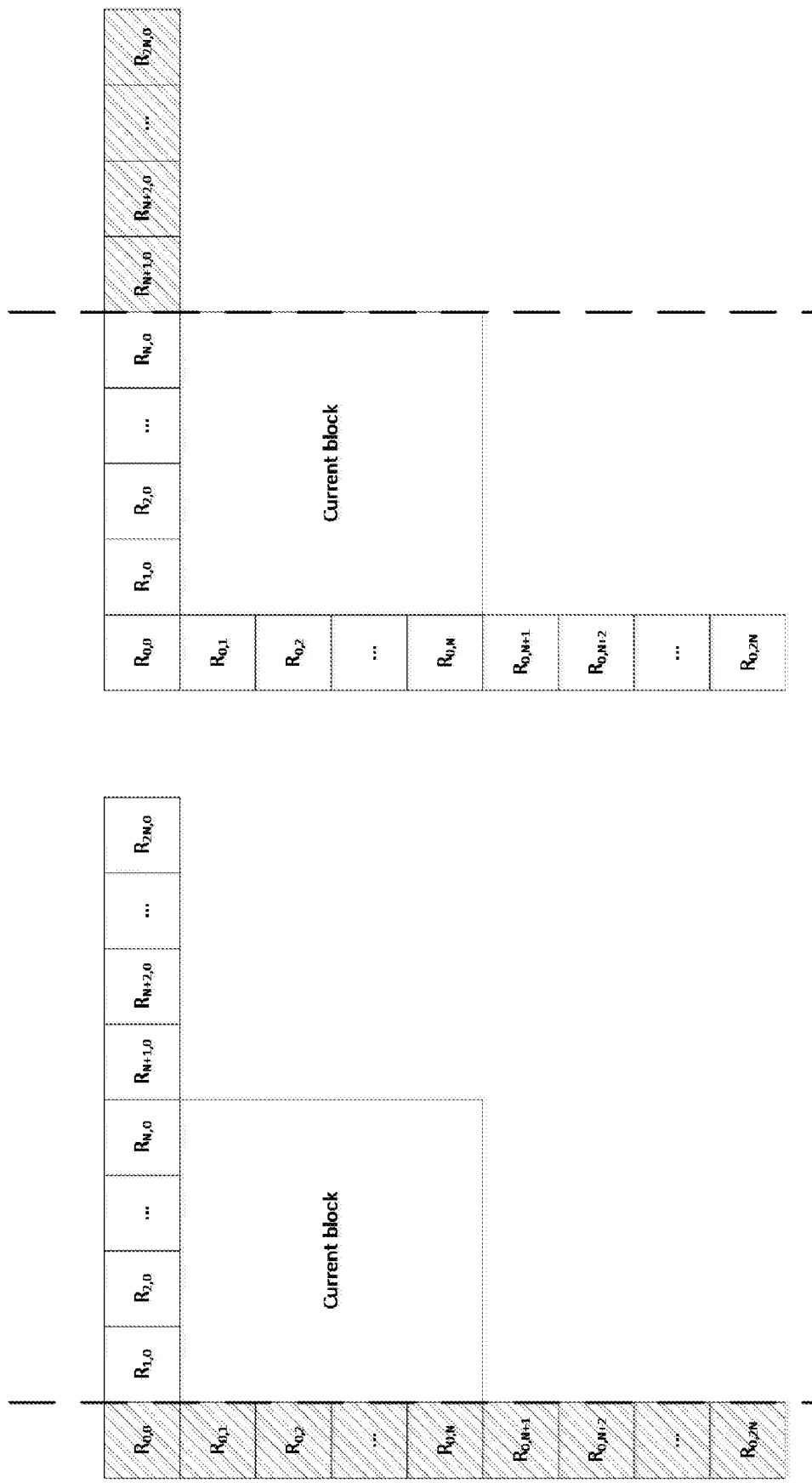

HANDLING FACE DISCONTINUITIES IN 360-DEGREE VIDEO CODING

CROSS-REFERENCE TO RELATED APPLICATIONS

This application is a Continuation Application of U.S. Non-Provisional application Ser. No. 16/648,163, filed Mar. 17, 2020, which is the National Stage Entry under 35 U.S.C. § 371 of Patent Cooperation Treaty Application No. PCT/US2018/051798, filed Sep. 19, 2018, which claims the benefit of U.S. Provisional Application Ser. No. 62/560,992, filed Sep. 20, 2017, U.S. Provisional Application Ser. No. 62/622,551, filed Jan. 26, 2018, U.S. Provisional Application Ser. No. 62/625,575, filed Feb. 2, 2018, and U.S. Provisional Application Ser. No. 62/628,752, filed Feb. 9, 2018, the contents of which are incorporated by reference herein.

BACKGROUND

Virtual reality (VR) is being applied in many application areas including, but not limited to, healthcare, education, social networking, industry design/training, games, movies, shopping, entertainment, and/or the like. VR may enhance the viewer's experience, for example, by creating a virtual environment surrounding the viewer and generating a true sense of 'being there' for the viewer. A VR system may support interactions through posture, gesture, eye gaze, voice, etc. The system may provide haptic feedback to the user such that the user may interact with objects in the VR environment in a natural way.

SUMMARY

Systems, methods, and instrumentalities may be provided for discounting reconstructed samples and/or coding information from spatial neighbors across face discontinuities. Whether a current block is located at a face discontinuity may be determined. The face discontinuity may be a face boundary between two or more adjoining blocks that are not spherical neighbors. The coding availability of a neighboring block of the current block may be determined, e.g., based on whether the neighboring block is on the same side of the face discontinuity as the current block. For example, the neighboring block may be determined to be available for decoding the current block if it is on the same side of the face discontinuity as the current block, and unavailable if it is not on the same side of the face discontinuity. The neighboring block may be a spatial neighboring block or a temporal neighboring block.

Determining that the current block is located at the face discontinuity may be based on a face discontinuity indication in a bitstream. The face discontinuity indication may be an indication that a face boundary is a discontinuous face boundary. The face discontinuity indication may be an indication of two or more endpoints of the face discontinuity. The face discontinuity indication may be an indication of frame-packing information.

A decoding function may be performed on the current block, for example based on the coding availability of the neighboring block. The decoding function may include deriving a merge mode for the current block. For example, if the neighboring block is determined to be available, the neighboring block may be added to a merge candidate list (e.g., a list of candidate blocks). The neighboring block may be excluded from the merge candidate list if the neighboring block is determined to be unavailable. The decoding function may be, for example, inter-prediction, intra-prediction, cross-component linear model prediction, overlapped block motion compensation, a deblocking filter, a sample adaptive offset filter, or an adaptive loop filter.

The coding availability of a reconstructed sample may be determined, e.g., based on whether the reconstructed sample is on the same side of the face discontinuity as the current block. For example, the reconstructed sample may be determined to be available for decoding the current block if it is on the same side of the face discontinuity as the current block, and unavailable if it is not on the same side of the face discontinuity. An unavailable reconstructed sample may be replaced with one or more available reconstructed samples. A template that contains the unavailable reconstructed sample may be marked as unavailable.

A current block may be crossed by a face discontinuity. The current block may be split into two or more prediction units (PUs). The PUs may be separated by the face discontinuity. Motion compensation may be performed separately for each PU.

Performing a decoding function on the current block based on the coding availability of the reconstructed sample may include applying one or more of cross-component linear model prediction, overlapped block motion compensation (OMBC), a deblocking filter (DBF), a sample adaptive offset (SAO) filter and/or an adaptive loop filter (ALF).

Face discontinuities in frame-packed picture may be identified, for example based on a face discontinuity indication signaled in a bitstream. In examples, the face discontinuity indication may include frame-packing information that identifies edges corresponding to face discontinuities. In examples, the face discontinuity indication may include an indication of whether a boundary between two faces is continuous or discontinuous. In examples, the face discontinuity indication may include an indication of the endpoint coordinates of a face discontinuity. The determination and/or signaling of face discontinuities may be performed.

For intra and inter prediction, if a block is located on the right side of a face discontinuity, the left, above left, and below left frame-packed neighbor blocks may be located on the other side of the face discontinuity and may be considered as unavailable for inferring attributes, e.g., for deriving the most probable mode in the intra angular process, for deriving the merge mode in inter prediction, and/or for motion vector prediction. Similar considerations may be applied to a current block which may be located on the left side of, above, and/or below a face discontinuity. The coding availability of spatial candidates at face discontinuities may be determined.

For intra and inter prediction, if a block is located on the right side of a face discontinuity, the reconstructed samples located on the left side of the block may be located on the other side of the face discontinuity and may not be correlated with the current block samples. In this case, the reconstructed samples may be considered as unavailable in one or more prediction approaches, e.g., DC, planar, and/or angular modes in intra prediction, Frame Rate Up Conversion (FRUC) template mode and local illumination compensation (LIC) mode in inter prediction. Similar considerations may be applied to a current block that is located on the left side of, above, and/or below a face discontinuity. The coding availability of reconstructed samples at face discontinuities may be determined.

For cross-component linear model prediction, reconstructed samples at face discontinuities may be discarded if they are not located on the same side of a face discontinuity as the current block. For example, if a block is located on the right side of (or below) a face discontinuity, the reconstructed samples located on the left side of (or above) the face discontinuity may be discarded for estimating the parameters of the linear model. Derivation of the linear model parameters may be performed.

The template on a side of a face discontinuity may be discarded for a DIMD search. For example, if a block is located on or near the right side of (e.g., below) a face discontinuity, and part or all of the samples from the left (e.g., top) template and/or part or all of the samples from the left (e.g., top) reference samples used to predict the left (e.g., top) template are located on the other side of the face discontinuity, the template on the other side of the discontinuity may be discarded for a DIMD search. The usage of the top and left templates near face discontinuities in DIMD may be determined.

For OBMC, if the current block (or sub-block) is located on the right side of a face discontinuity, the adjustment of the first columns of the current block (or sub-block) using the motion vector of the right block (or sub-block), which is located on the other side of the face discontinuity, may be skipped. Similar considerations may be applied to a current block (or sub-block) which is located on the left side of, above, and/or below a face discontinuity. OBMC-based adjustment of (blocks (or sub-blocks) at face discontinuities may be performed.

For DBF, if a vertical (or horizontal) block boundary is within the proximity of a vertical (or horizontal) face discontinuity such that one or more (e.g., all) samples used in the DBF filter are not located on the same side of the face discontinuity, DBF may be disabled across the block boundary. Deblocking across face discontinuities may be performed.

For SAO, if the current sample is located on the right side of a face discontinuity, the horizontal and two diagonal categories in the edge offset mode may be disabled for that sample position, as a sample used in gradient based classification may be located on the other side of the face discontinuity and may not be correlated with the current sample. Similar considerations may be applied to a current sample which is located on the left side of, above, and/or below a face discontinuity. The SAO process at face discontinuities may be performed.

For ALF, if a current luma (or chroma) sample is located within four (or two) samples from a face discontinuity, ALF may be disabled for that sample location, as one or more samples used in the 9×9 (or 5×5) diamond filter may be located on the other side of the face discontinuity and may not be correlated with the current sample. ALF may be performed at face discontinuities.

BRIEF DESCRIPTION OF THE DRAWINGS

FIG. 1(*b*) illustrates an example 2D planar in ERP.

FIG. 1(*c*) illustrates an example picture produced using ERP.

FIG. 2(*b*) illustrates an example 2D planar with 3×2 frame-packing and six faces.

FIG. 2(*c*) illustrates an example picture produced using cubemap projection.

FIG. 16 illustrates examples of adaptive loop filter (ALF) shapes: (a) 5×5 diamond; (b) 7×7 diamond; and (c) 9×9 diamond filter shapes.

DETAILED DESCRIPTION

Figure 1A:
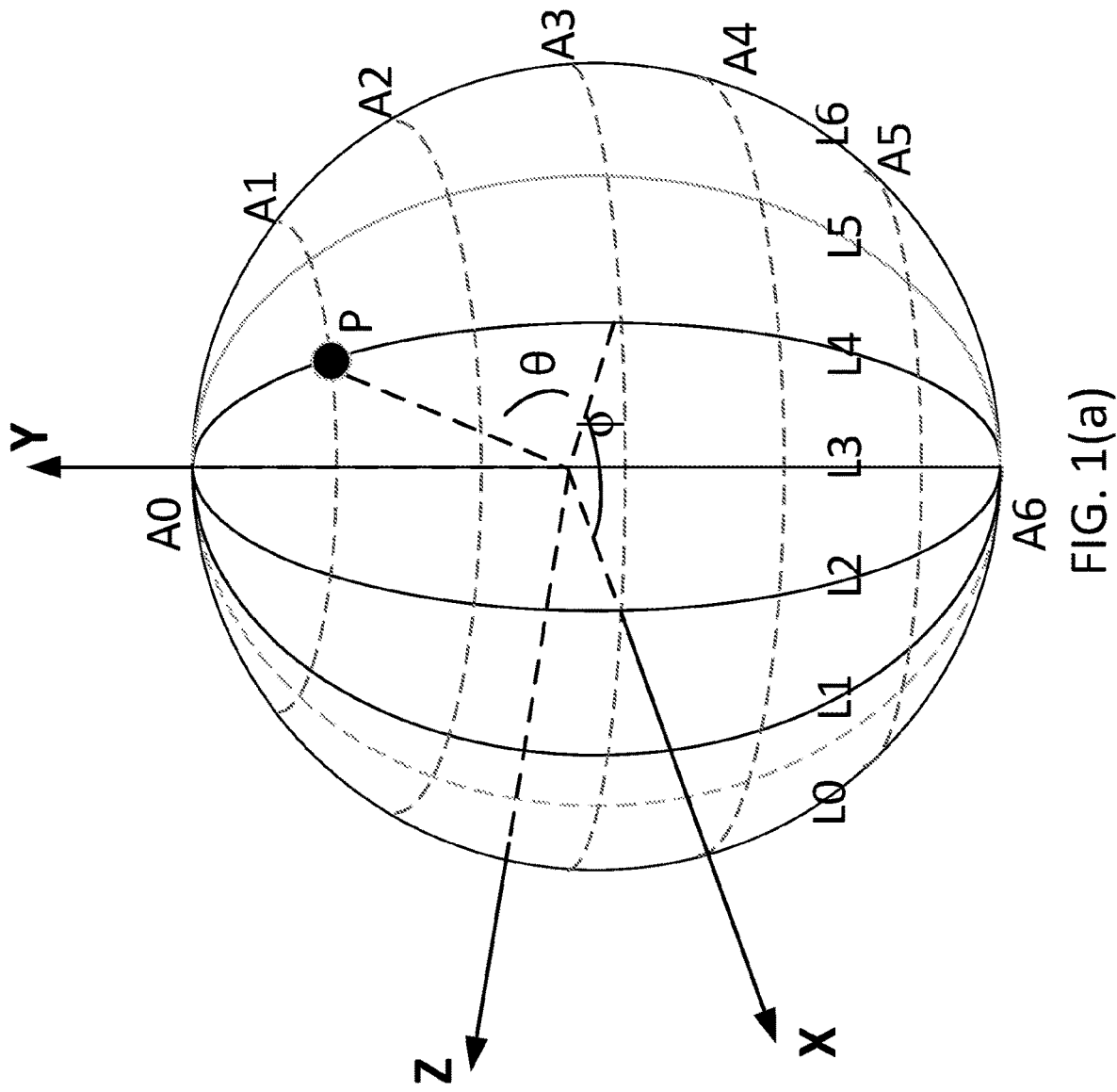
FIG. 1(*a*) illustrates an example sphere sampling along a longitude direction and a latitude direction in an equirectangular projection (ERP).

A detailed description of illustrative embodiments will now be described with reference to the various Figures. Although this description provides a detailed example of possible implementations, it should be noted that the details are intended to be exemplary and in no way limit the scope of the application.

VR systems may use one or more omnidirectional videos. For example, one or more omnidirectional videos may include one or more 360-degree videos. The 360-degree videos may be viewed from 360-degree angles in the horizontal direction and from 180-degree angles in the vertical direction. VR systems and 360-degree videos may be used for media consumption beyond Ultra High Definition (UHD) services. Free view TV (FTV) may test the performance of solutions. For example, FTV may test the performance of a 360-degree video (e.g., or an omnidirectional video) based system and/or a multi-view based system.

VR systems may include a processing chain. The processing chain may include capturing, processing, display, and/or applications. With respect to capturing, a VR system may use one or more cameras to capture scenes from different divergent views (e.g., 6 to 12 views). The views may be stitched together to form a 360-degree video (e.g., in high resolution such as 4K or 8K). The client and/or user side of a VR system may include a computation platform, a head mounted display (HMD), and/or one or more head tracking sensors. The computation platform may receive and/or decode 360-degree videos. The computation platform may generate a viewport for display. Two pictures (e.g., one for each eye) may be rendered for the viewport. The two pictures may be displayed in the HMD for stereo viewing. One or more lenses may be used to magnify images displayed in the HMD (e.g., for better viewing). The head tracking sensors may keep track (e.g., constantly keep track) of the viewer's head orientation. Orientation information may be fed to the VR system to display the viewport picture for that orientation. A VR system may provide a specialized touch device. For example, a specialized touch device may allow a viewer to interact with objects in the virtual world. A VR system may be driven by a workstation with a graphic processing unit (GPU) support. A VR system may use a mobile device (e.g., a smartphone) as a computation platform, as a HMD display and/or as a head tracking sensor. Spatial resolution of an HMD may be, for example, 2160× 1200. A refresh rate may be, for example, 90 Hz. A field of view (FOV) may be, for example, about 110 degrees. Sampling rate fora head tracking sensor may be, for example, 1000 Hz, to capture fast movements. A VR system may comprise lens and a cardboard, and may be driven by a smartphone. A VR system may be used for gaming. One or more 360-degree video streaming services may be provided.

A VR system may be capable of providing interactivity and/or haptic feedback. A HMD that is big may not be convenient for a person to wear. A resolution of 2160×1200 for stereoscopic views (e.g., as provided by certain HMDs) may not be sufficient, and may cause dizziness and discomfort for some users. Resolution increase may be desirable VR experience may be enhanced by combining the visual effects of a VR system with force feedback of the real world. A VR roller coaster application may be an example of combining the visual effects of a VR system with force feedback of the real world.

Figure 1B:
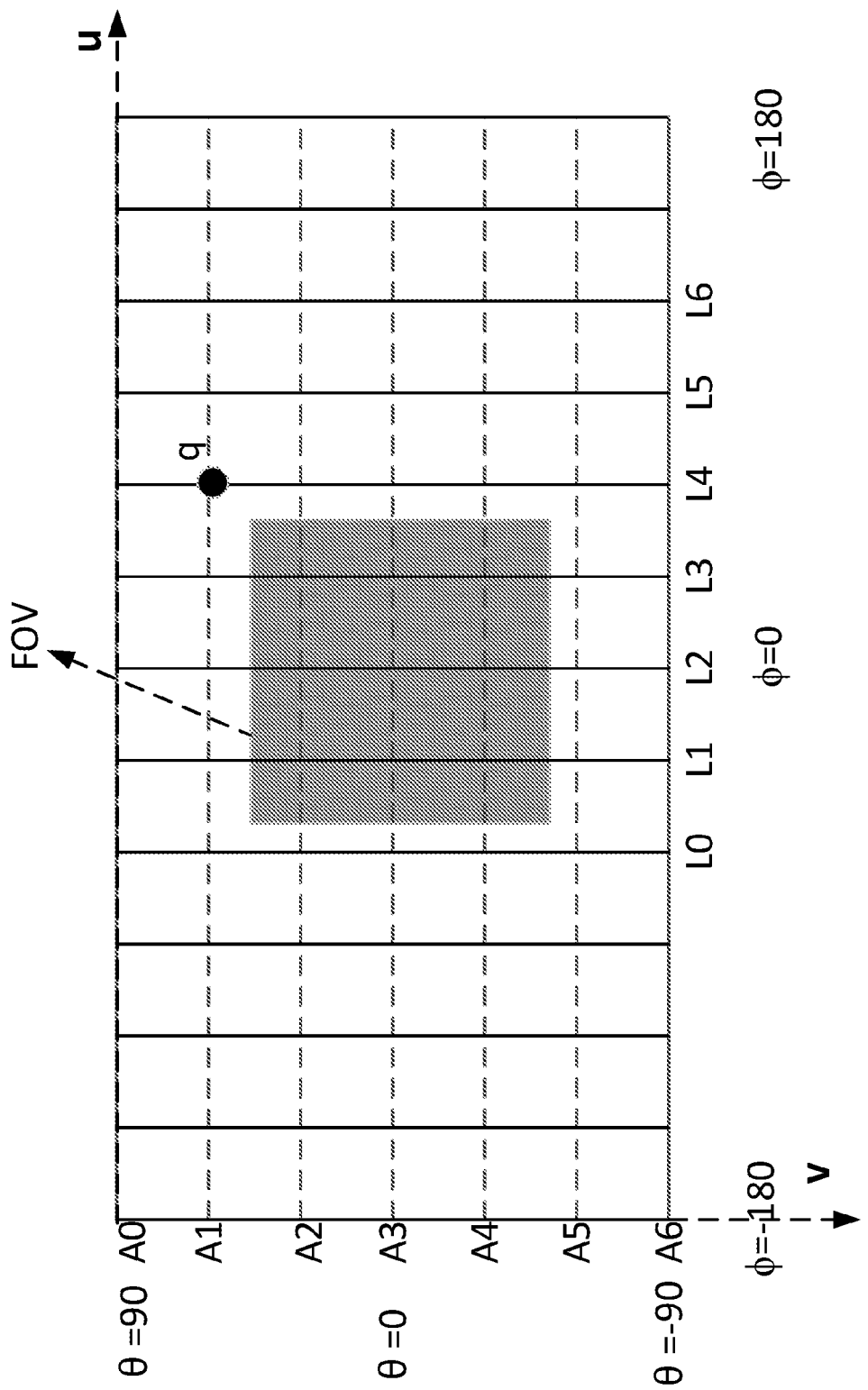

360-degree videos may be compressed and/or delivered, for example, using Dynamic Adaptive Streaming over HTTP (DASH)-based video streaming techniques. 360-degree video content may be represented with a sphere geometry structure. For example, synchronized multiple views may be captured by multiple cameras and may be stitched on a sphere. The synchronized multiple views may be stitched on the sphere as an (e.g., one) integral structure. The sphere information may be projected onto a 2D planar surface via a geometry conversion process. For example, the sphere information may be projected onto a 2D planar surface using an equirectangular projection (ERP). FIG. 1(a) shows an example sphere sampling in longitudes (φ) and latitudes (θ). FIG. 1(b) shows an example sphere being projected onto a 2D plane using ERP. The longitude φ in the range [−π, π] may be referred to as yaw, and the latitude θ in the range [−π/2, π/2] may be referred to as pitch (e.g., in aviation). π may be the ratio of a circle's circumference to its diameter. (x, y, z) may represent a point's coordinates in a 3D space. (ue, ve) may represent a point's coordinates in a 2D plane after ERP. ERP may be represented mathematically, for example, as shown in Equations (1) and/or (2).

$$ue = (\varphi/(2/\pi)+0.5)*W \quad (1)$$

$$ve = (0.5-\theta/\pi)*H \quad (2)$$

where W and H may be the width and height, respectively, of a 2D planar picture. As shown in FIG. 1(a), the point P may be a cross point between longitude L4 and latitude A1 on the sphere. P may be mapped to a unique point q in FIG. 1(b) in the 2D plane using Equations (1) and/or (2). Point q in the 2D plane shown in FIG. 1(b) may be projected back to point P on the sphere shown in FIG. 1(a), for example via inverse projection. The field of view (FOV) in FIG. 1(b) shows an example of an FOV in a sphere being mapped to 2D plane with a viewing angle along the X axis at about 110 degrees.

Figure 1C:
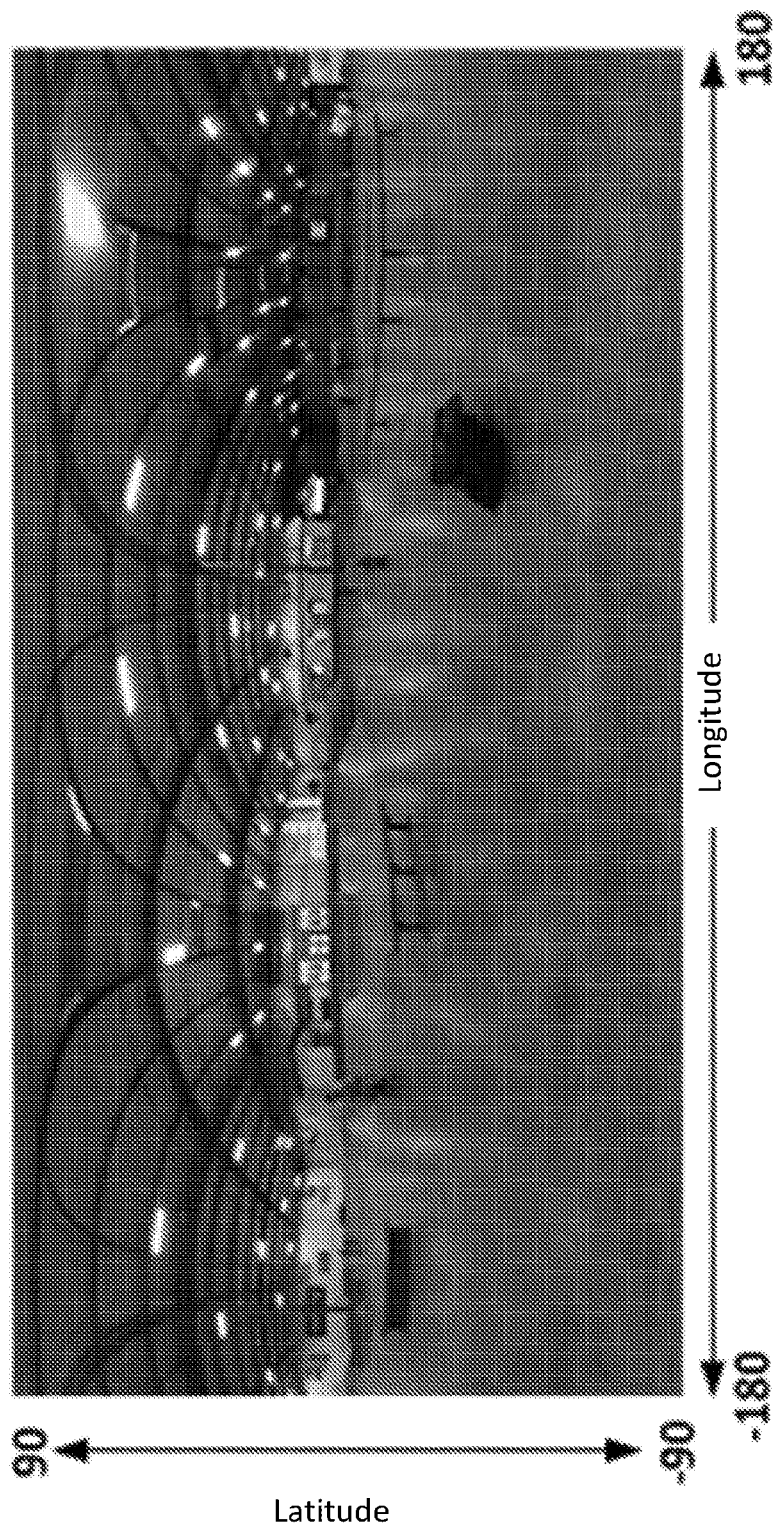

One or more 360-degree videos may be mapped to 2D videos. For example, 360-degree videos may be mapped to 2D videos using ERP. The 360-degree videos may be encoded with a video codec such as H.264 or high efficiency video coding (HEVC), and may be delivered to a client. For example, the 360-degree videos may be mapped to 2D video, and the 2D video may be encoded and delivered to the client. At the client side, the videos may be decoded (e.g., in equirectangular format) and rendered based on the user's viewport, for example by projecting and displaying the portion belonging to an FOV in the equirectangular pictures onto an HMD. The characteristics of an equirectangular 2D picture may be different from a non-equirectangular 2D picture (e.g., a rectilinear video picture). FIG. 1(c) shows an example equirectangular picture. The top portion of the picture shown in FIG. 1(c) may correspond to the North Pole, and the bottom portion may correspond to the South Pole. As shown in FIG. 1(c), the top and/or the bottom portions may be stretched. For example, the top and/or the bottom portions may be stretched compared to the middle portion of the picture corresponding to the Equator. The stretching in the top and/or bottom portions may indicate that equirectangular sampling in the 2D spatial domain is uneven.

Figure 2A:
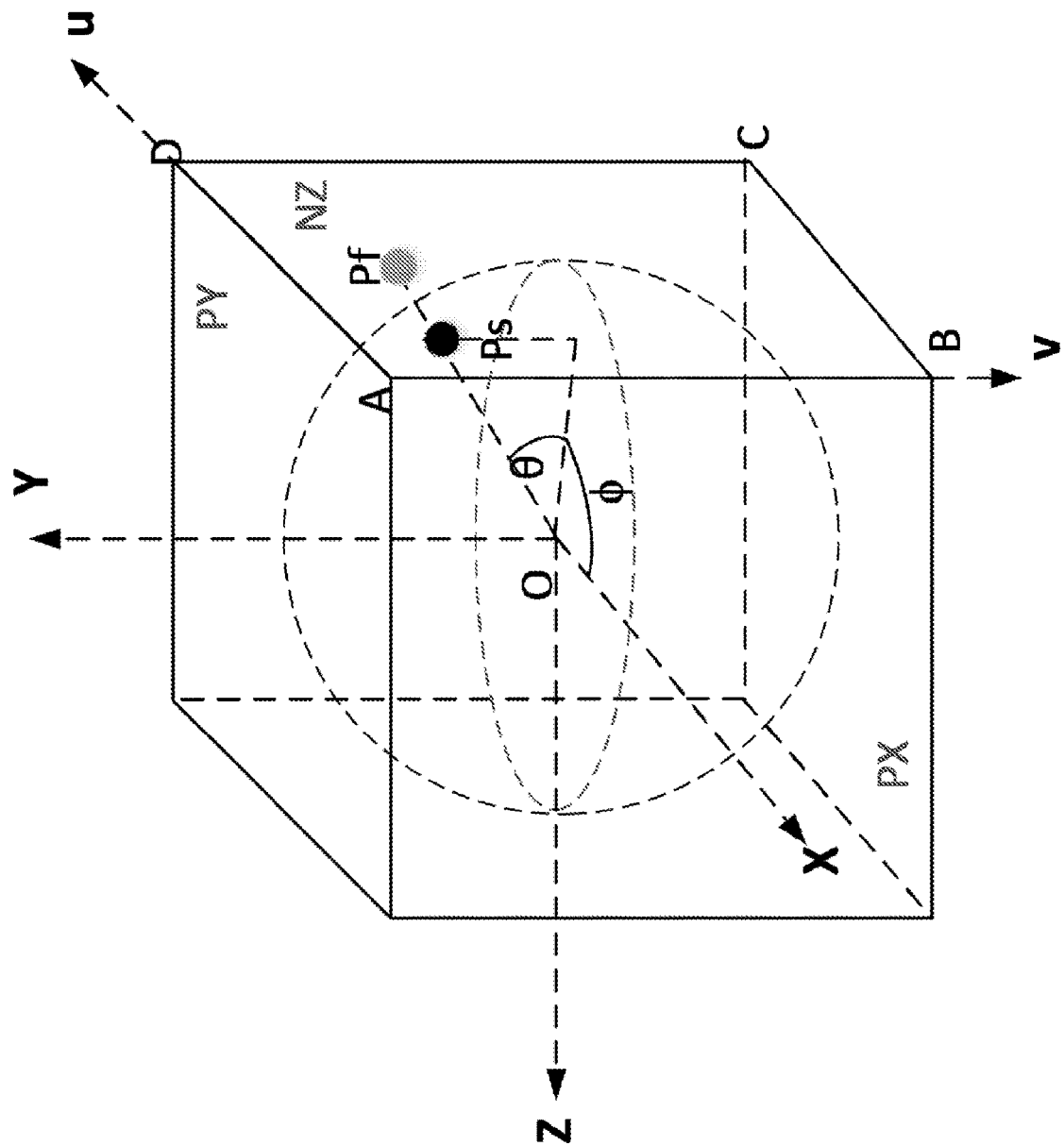
FIG. 2(*a*) illustrates an example 3D geometry structure in a cubemap projection (CMP).

As shown in FIG. 1 (c), the top and bottom portions of the ERP picture, which may correspond to North Pole and South Pole respectively, may be stretched compared to the middle portion of the picture. The spherical sampling density may be uneven for ERP format. Various geometric projection formats may be used to map 360-degree video onto multiple faces. FIG. 2 (a) shows an example of cubemap projection (CMP) geometry. The CMP may include 6 square faces, which may be labeled as PX, PY, PZ, NX, NY, NZ, where P may stand for positive, N may stand for negative, and X, Y, Z may refer to the axes. These faces may also be labeled using numbers 0-5, e.g. according to PX (0), NX (1), PY (2), NY (3), PZ (4), NZ (5). The lateral length of each face may be 2, e.g. if the radius of the tangent sphere is 1. The 6 faces of CMP format may be packed together into a single picture. Some faces may be rotated by a certain degree, e.g., to maximize continuity between neighboring faces. FIG. 2 (b) shows an example packing method to place 6 faces into a rectangular picture, where (e.g., for better visualization) a face index (e.g., each face index) is put in the direction that is aligned with the corresponding rotation of the face. For example, faces #3 and #1 may be rotated counter-clockwise by 270 and 180 degrees, respectively, while the other faces may not be rotated. An example picture with CMP is given in FIG. 2 (c). As shown in FIG. 2 (c), the top row of 3 faces may be spatially neighboring faces in the 3D geometry and may have continuous texture, and the bottom row of 3 faces may be spatially neighboring faces in the 3D geometry and therefore may have continuous texture. The top face row and the bottom face row may not be spatially continuous in 3D geometry, and a seam (e.g., a discontinuous boundary) may exist between the two face rows. A face boundary between two or more adjoining blocks that are not spherical neighbors may be referred to as a face discontinuity.

In CMP, assuming the sampling density is equal to 1 at the center of a face (e.g., each face), the sampling density may increase towards the edges, which means that the texture around the edges may be stretched compared to that at the center. In different cubemap-based projections, e.g., equi-angular cubemap projection (EAC) and/or adjusted cubemap projection (ACP), a face (e.g., each face) may be adjusted using a non-linear warping function in vertical and/or horizontal directions to achieve a more even sampling density. In EAC, the adjustment may be performed using a tangent function, whereas the adjustment may be performed using a second order polynomial function in ACP. A generalization of EAC and ACP, which may be called hybrid cubemap projection (HCP), may be used. In HCP, the adjustment function and its parameters may be tuned for a face (e.g., each face) and direction individually to provide better coding efficiency. The cube-based projections may be packed in a similar fashion as for the CMP.

Figure 3:
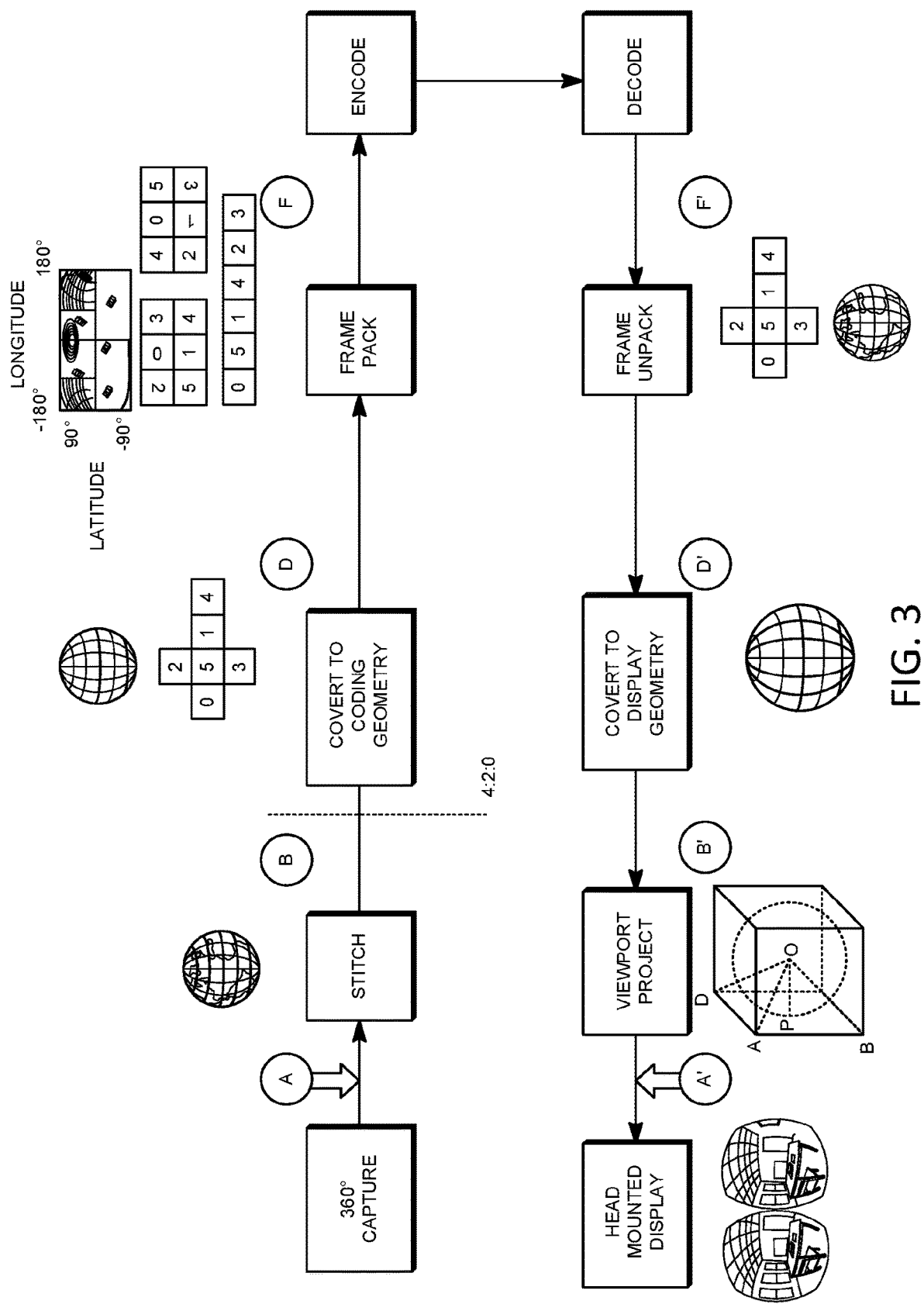
FIG. 3 illustrates an example 360-degree video processing.

FIG. 3 illustrates an example work flow for 360-degree video processing. A 360-degree video capture may be captured using one or more cameras. For example, one or more cameras may be used to capture a 360-degree video covering a spherical space. The videos may be stitched together. For example, the videos may be stitched together using an equirectangular geometry structure. The equirectangular geometry structure may be converted to another geometry structure, such as a cubemap geometry, for encoding (e.g., encoding with video codecs). The coded video may be delivered to the client, for example, via dynamic streaming and/or broadcasting. The video may be decoded, for example, at the receiver. The decompressed frame may be unpacked to a display such as a display geometry. For example, the display geometry may be in an equirectangular geometry. The geometry may be used for rendering. For example, the geometry may be used for rendering via viewport projection according to a user's viewing angle.

Figure 4:
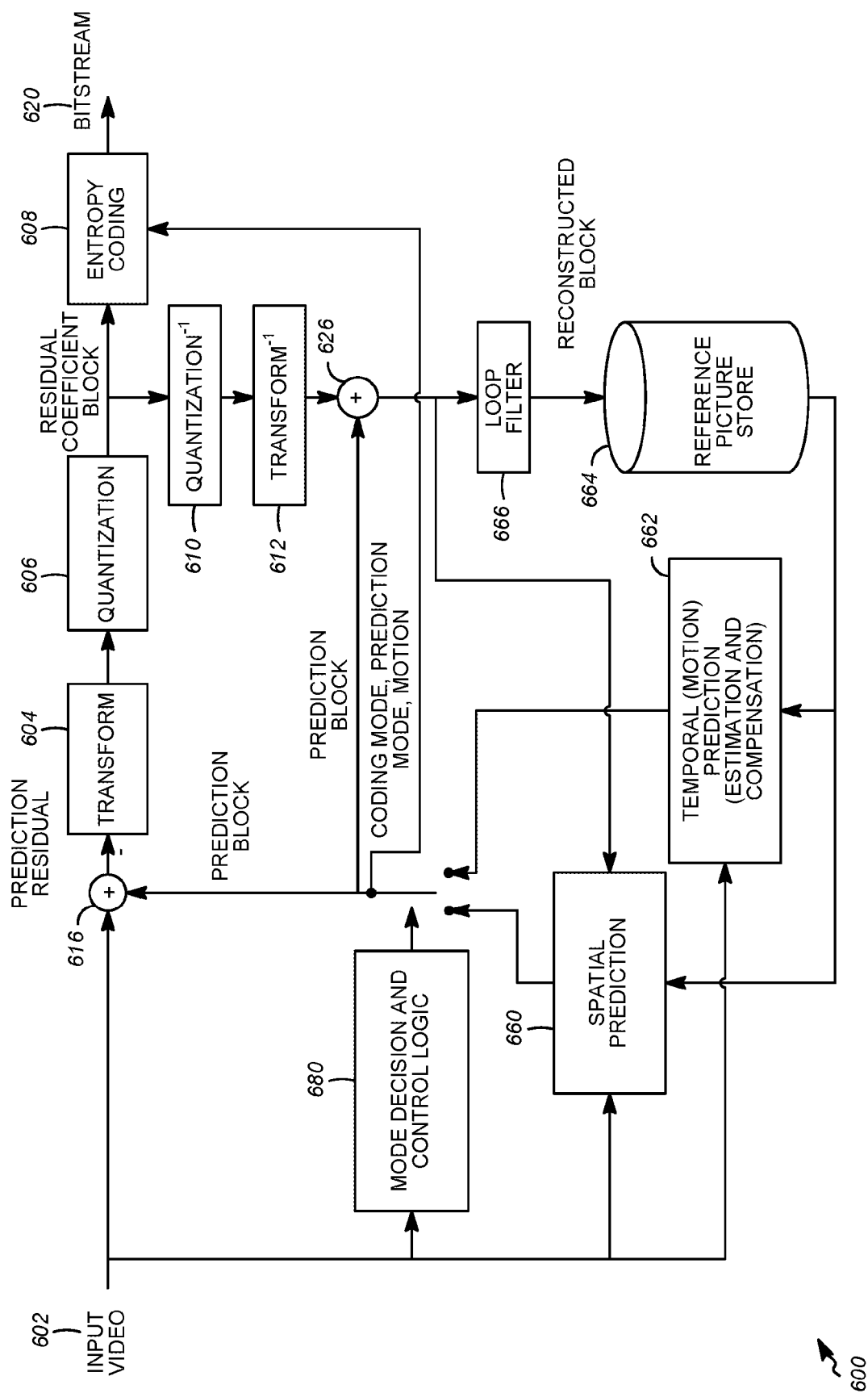
FIG. 4 illustrates a block diagram of an example block-based encoder.

FIG. 4 shows a block diagram of an example block-based hybrid video encoding system 600. The input video signal 602 may be processed block by block. Extended block sizes (e.g., referred to as a coding unit or CU) may be used (e.g., in HEVC) to compress high resolution (e.g., 1080p and/or beyond) video signals. A CU may have up to 64×64 pixels (e.g., in HEVC). A CU may be partitioned into prediction units or PUs, for which separate predictions may be applied. For an input video block (e.g., a macroblock (MB) or CU), spatial prediction 660 or temporal prediction 662 may be performed. Spatial prediction (e.g., or intra prediction) may use pixels from already coded neighboring blocks in the same video picture and/or slice to predict a current video block. Spatial prediction may reduce spatial redundancy inherent in the video signal. Temporal prediction (e.g., referred to as inter prediction or motion compensated prediction) may use pixels from already coded video pictures to predict a current video block. Temporal prediction may reduce temporal redundancy inherent in the video signal. A temporal prediction signal for a given video block may be signaled by a motion vector that indicates the amount and/or direction of motion between the current block and its reference block. If multiple reference pictures are supported (e.g., in H.264/AVC or HEVC), the reference picture index of a video block may be signaled to a decoder. The reference index may be used to identify from which reference picture in a reference picture store 664 the temporal prediction signal may come.

After spatial and/or temporal prediction, a mode decision 680 in the encoder may select a prediction mode, for example based on a rate-distortion optimization. The prediction block may be subtracted from the current video block at 616. Prediction residuals may be de-correlated using a transform module 604 and a quantization module 606 to achieve a target bit-rate. The quantized residual coefficients may be inverse quantized at 610 and inverse transformed at 612 to form reconstructed residuals. The reconstructed residuals may be added back to the prediction block at 626 to form a reconstructed video block. An in-loop filter such as a de-blocking filter and/or an adaptive loop filter may be applied to the reconstructed video block at 666 before it is put in the reference picture store 664. Reference pictures in the reference picture store 664 may be used to code future video blocks. An output video bit-stream 620 may be formed. Coding mode (e.g., inter or intra), prediction mode information, motion information, and/or quantized residual coefficients may be sent to an entropy coding unit 608 to be compressed and packed to form the bit-stream 620.

Figure 5:
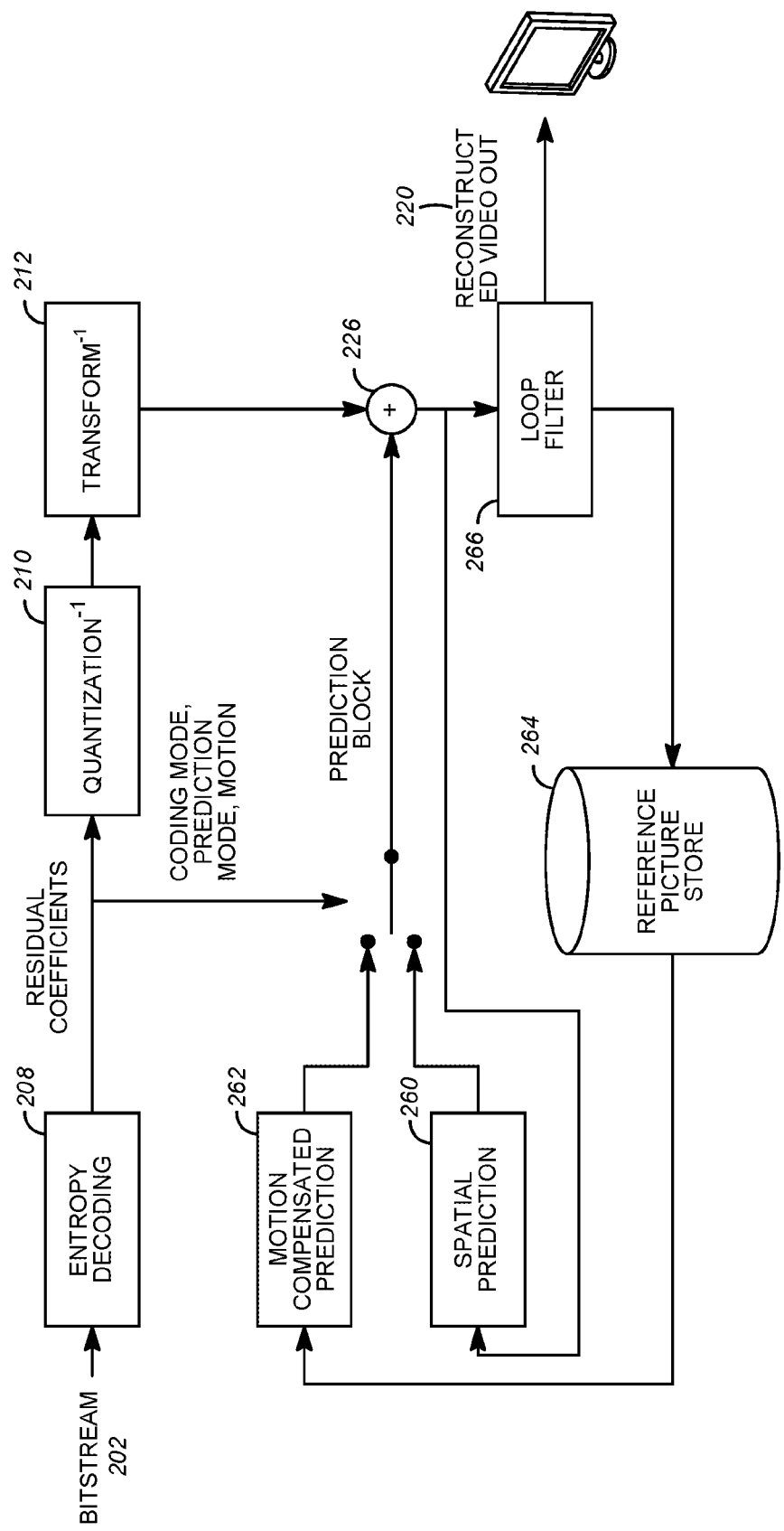
FIG. 5 illustrates a block diagram of an example block-based decoder.

FIG. 5 shows a general block diagram of an example block-based video decoder. A video bit-stream 202 may be received, unpacked, and/or entropy decoded at an entropy decoding unit 208. Coding mode and/or prediction information may be sent to a spatial prediction unit 260 (e.g., if intra coded) and/or to a temporal prediction unit 262 (e.g., if inter coded). A prediction block may be formed the spatial prediction unit 260 and/or temporal prediction unit 262. Residual transform coefficients may be sent to an inverse quantization unit 210 and an inverse transform unit 212 to reconstruct a residual block. The prediction block and residual block may be added at 226. The reconstructed block may go through in-loop filtering 266 and may be stored in a reference picture store 264. Reconstructed videos in the reference picture store 264 may be used to drive a display device and/or to predict future video blocks.

Figure 6:
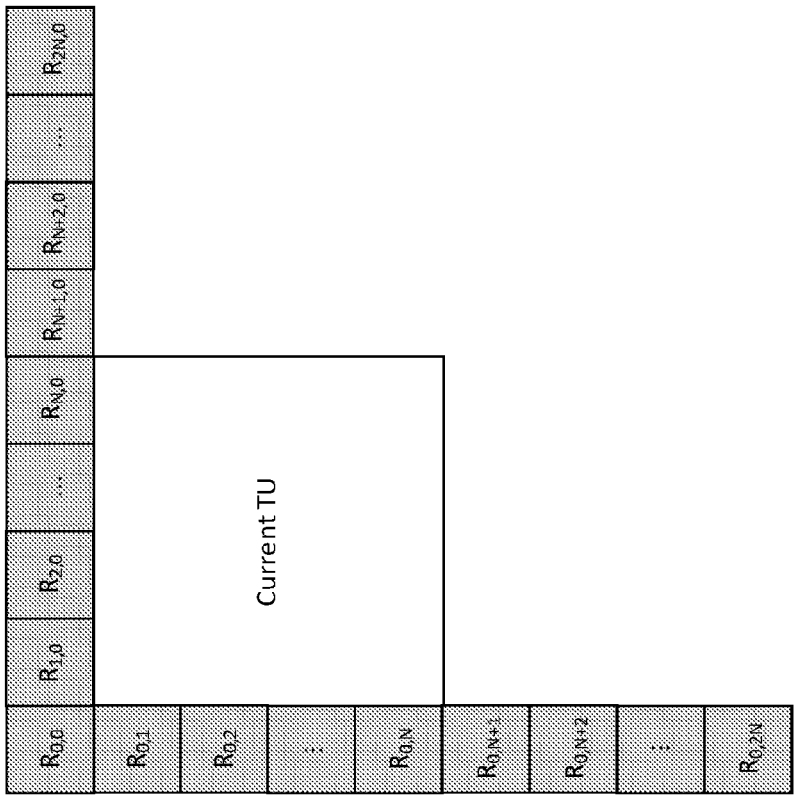
FIG. 6 illustrates an example of using reference samples in high efficiency video coding (HEVC) intra prediction.

Intra prediction and/or inter prediction may be performed in video coding. Intra prediction may be used to predict the sample value with neighboring reconstructed samples. For example, the reference samples used for intra prediction of a current transform unit (TU) are shown in FIG. 6. The reference samples may be from the left and/or top neighboring reconstructed samples as shown in the shaded boxes in FIG. 6.

Figure 7:
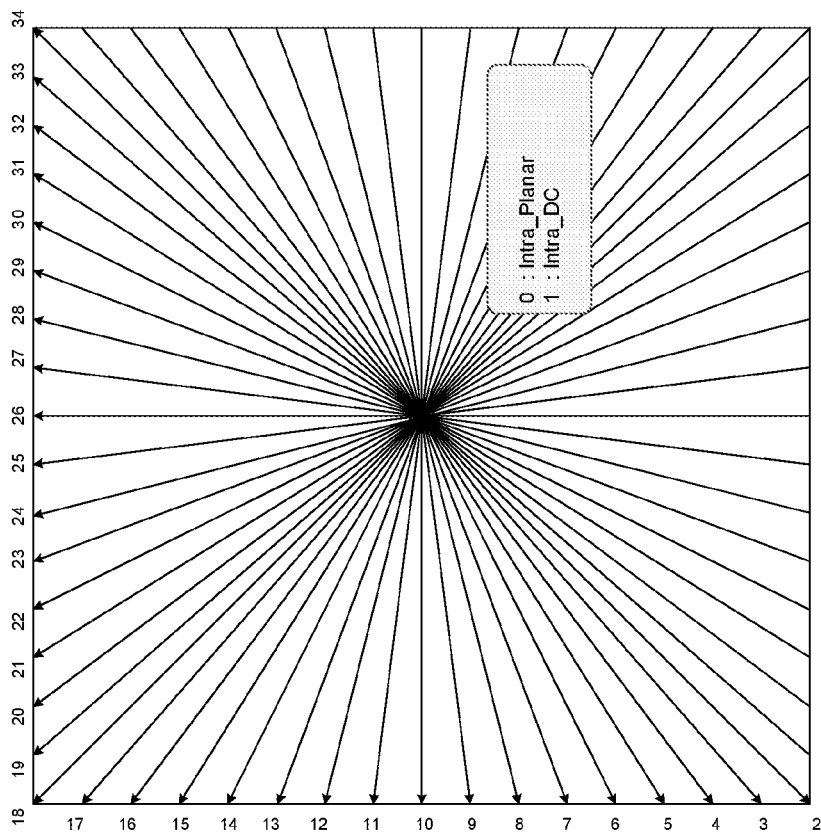
FIG. 7 illustrates example indications of intra prediction directions in HEVC.
Figure 8:
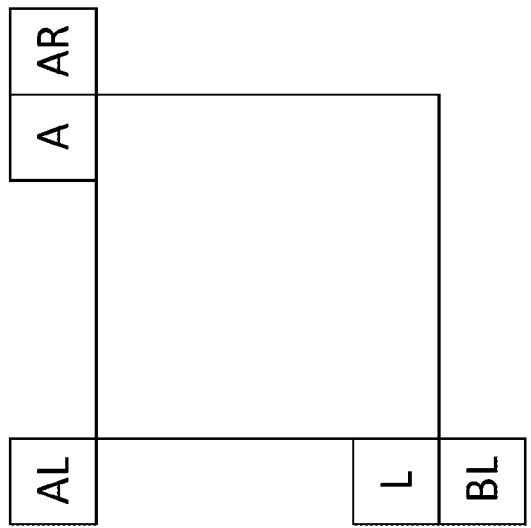
FIG. 8 illustrates examples of spatial neighbors used for deriving the most probable modes in the HEVC intra angular process.

FIG. 7 illustrates an example indication of angular intra prediction modes. HEVC may support a variety of (e.g., 35) intra prediction modes, such as a DC mode (e.g., mode 1), a planar mode (e.g., mode 0), and 33 directional or angular intra prediction modes. The planar prediction mode may generate a first order approximation for a current block using, for example, the top and left reconstructed samples. The angular prediction modes may be designed (e.g., specially designed) to predict directional textures. The intra prediction mode may be selected (e.g., at the encoder side). For example, the intra prediction mode may be selected at the encoder side by minimizing the distortion between a prediction generated by an intra prediction mode (e.g., each intra prediction mode) and one or more original samples. The intra prediction mode may be selected based on minimizing a rate distortion cost using rate distortion optimization. The intra prediction mode may be encoded, for example, using most probable mode (MPM) for intra coding. MPM may reuse the intra angular mode of spatial neighboring PUs. FIG. 8 illustrates examples of spatial neighbors used for deriving the MPMs in the HEVC intra angular process. FIG. 8 may show the spatial neighbors (e.g., bottom left, left, top right, top, and/or top left) used for MPM candidate derivation in HEVC. A selected MPM candidate index may be coded. An MPM candidate list may be constructed at the decoder side (e.g., in the same way as at the encoder). An entry with the signaled MPM candidate index may be used as the intra angular mode of current PU.

Figure 9:
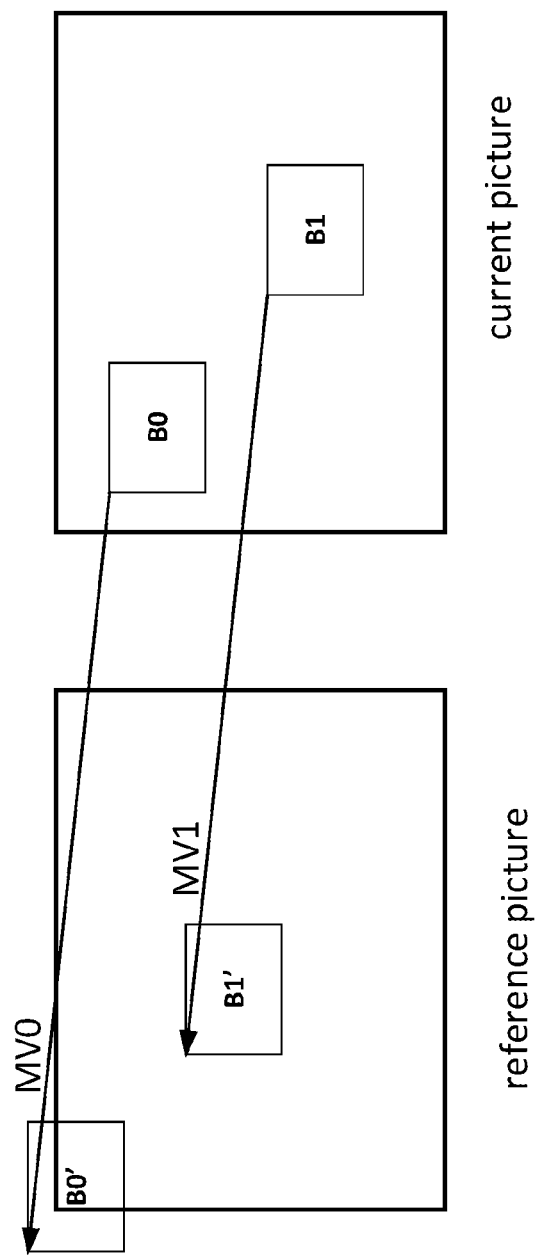
FIG. 9 illustrates an example inter prediction with one motion vector (uni-prediction).
Figure 10:
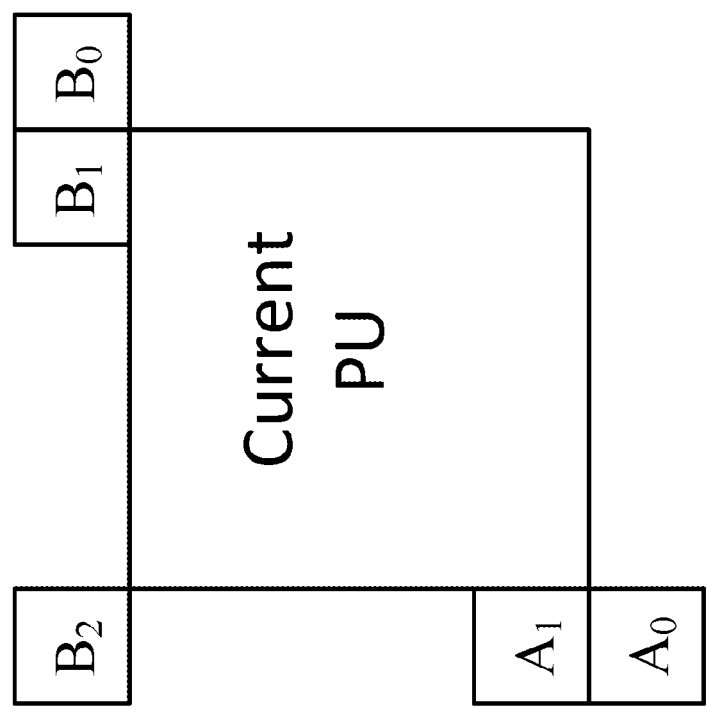
FIG. 10 illustrates examples of spatial neighbors used in deriving spatial merge candidates in the HEVC merge process.

FIG. 9 illustrates an example inter prediction with one motion vector (MV) (e.g., uni-prediction). The blocks B0' and B1' in the reference picture of FIG. 9 may be the reference blocks of block B0 and B1, respectively. The motion vector information may be encoded, for example, by using motion vector prediction and/or merge mode for inter coding. The motion vector prediction may use the motion vectors from spatial neighboring PUs or a temporal collocated PU as the current MV's predictor. The encoder and/or the decoder may form a motion vector predictor candidate list in the same manner. The index of the selected MV predictor from the candidate list may be coded and/or signaled to the decoder. The decoder may construct a MV predictor list, and the entry with the signaled index may be used as the predictor of the current PU's MV. The merge mode may reuse the MV information of spatial and/or temporal neighboring. The encoder and/or the decoder may form a motion vector merge candidate list in the same manner. FIG. 10 illustrates examples of spatial neighbors being used in deriving spatial merge candidates in an HEVC merge process. As shown in FIG. 10, the spatial neighbors (e.g., bottom left, left, top right, top, and/or top left) may be used for merge candidate derivation in HEVC. The selected merge candidate index may be coded. The merge candidate list may be constructed at the decoder side (e.g., in the same way as at in the encoder). The entry with the signaled merge candidate index may be used as the MV of the current PU.

Figure 11B:
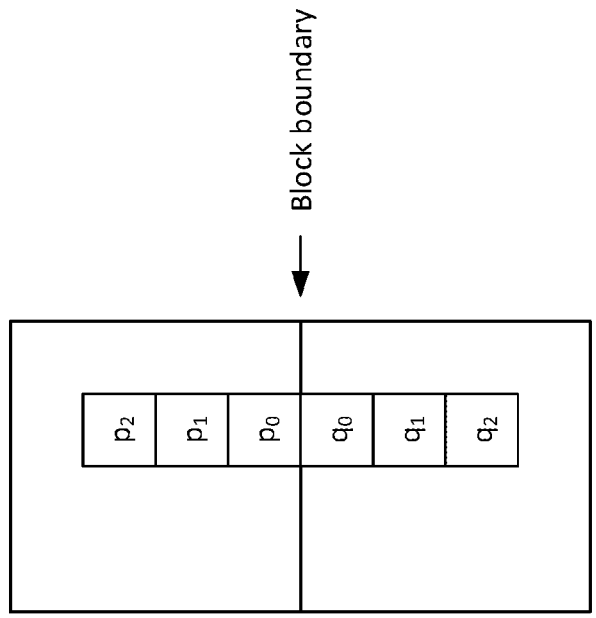
FIG. 11 illustrates examples of samples involved in deblocking filter (DBF) on/off decision, filter selection, and filtering.
Figure 11A:
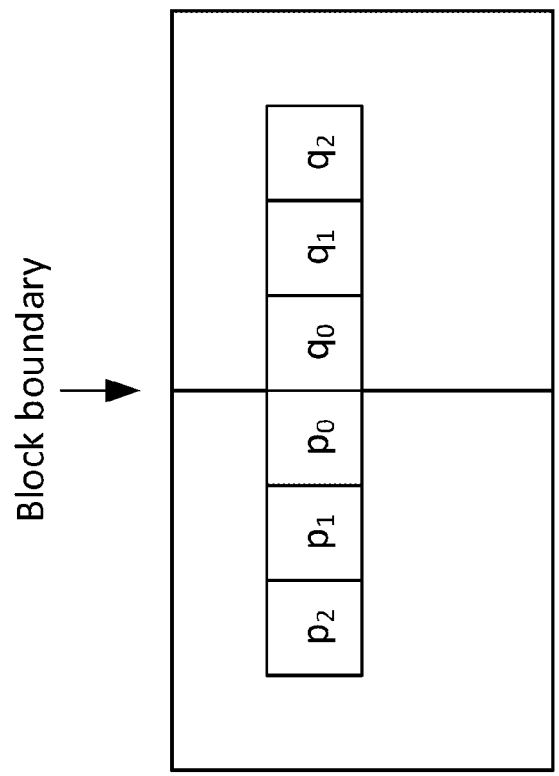
Figure 12:
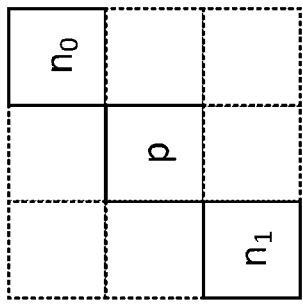
FIG. 12 illustrates examples of gradient patterns used in sample adaptive offset (SAO); (a) horizontal; (b) vertical; (c) diagonal; and (d) 45° diagonal gradient patterns.
Figure 12:
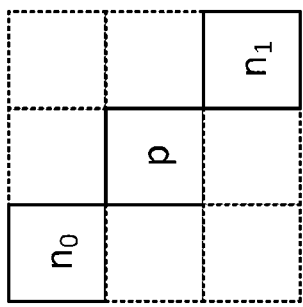
Figure 12:
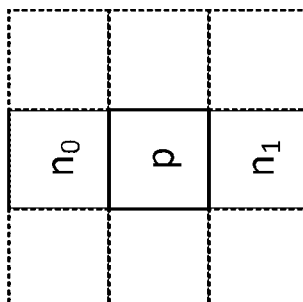
Figure 12:
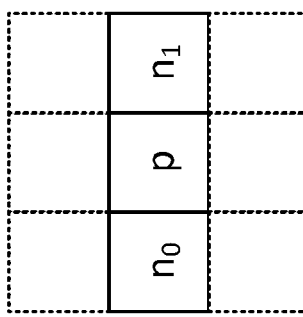

In HEVC, one or more (e.g., two) in-loop filters (e.g., a deblocking filter (DBF) followed by a sample adaptive offset (SAO) filter), may be applied to one or more reconstructed samples. The DBF may be configured to reduce blocking artifacts due to block-based coding. DBF may be applied (e.g., applied only) to samples located at PU and/or TU boundaries, except at the picture boundaries or when disabled at slice and/or tiles boundaries. Horizontal filtering may be applied (e.g., applied first) for vertical boundaries, and vertical filtering may be applied for horizontal boundaries. FIG. 11 illustrates examples of samples involved in DBP on/off decision, filter selection, and filtering. Given two adjacent blocks, P and Q, depending on the filter strength, up to three sample columns (or rows) on each side of the boundary may be filtered in horizontal (or vertical) filtering, as depicted in FIG. 11. SAO may be another in-loop filtering process that modifies decoded samples by conditionally adding an offset value to a sample (e.g., each sample), based on values in look-up tables transmitted by the encoder. SAO may have one or more (e.g., two) operation modes: band offset and edge offset modes. In the band offset mode, an offset may be added to the sample value depending on the sample amplitude. The full sample amplitude range may be divided into 32 bands, and sample values belonging to four of these bands may be modified by adding a positive or negative offset, which may be signaled for each coding tree unit (CTU). In the edge offset mode, the horizontal, vertical, and two diagonal gradients may be used for classification, as depicted in FIG. 12. FIG. 12 illustrates examples of four gradient patterns used in SAO. For each edge category, an offset may be signaled at CTU level.

Cross-component linear model prediction may be performed. RGB to YUV color conversion may be performed (e.g., to reduce the correlation between different channels). Cross-component linear model prediction may be used to predict chroma samples from corresponding luma samples using a linear model. The value of a given chroma sample $p_{i,j}$ may be predicted from the corresponding down sampled (e.g., if video is in 420 or 422 chroma format) reconstructed luma sample values, $L'_{i,j}$, as shown in Equation (3) (e.g., assuming a chroma block of N×N samples):

$$p_{i,j} = \alpha \cdot L'_{i,j} + \beta \tag{3}$$

The down sampled luma samples may be computed as shown in Equation (4):

$$L'_{i,j} = \frac{L_{2i,2j-1} + L_{2i-2,2j} + 2 \cdot L_{2i-1,2j} + L_{2i,2j} + \begin{array}{c} L_{2i-2,2j-1} + 2 \cdot L_{2i-1,2j-1} + \end{array}}{8} \tag{4}$$

The parameters of the linear model may be derived by minimizing the regression error between the top and left neighboring reconstructed samples and may be computed as shown in Equations (5) and (6):

$$\alpha = \frac{2 \cdot N \cdot \left[\sum_{i=1}^{N}(L'_{i,0} \cdot C_{i,0}) + \sum_{j=1}^{N}(L'_{0,j} \cdot C_{0,j})\right] - \left(\sum_{i=1}^{N} L'_{i,0} + \sum_{j=1}^{N} L'_{0,j}\right) \cdot \left(\sum_{i=1}^{N} C_{i,0} + \sum_{j=1}^{N} C_{0,j}\right)}{2 \cdot N \cdot \left[\sum_{i=1}^{N}(L'_{i,0} \cdot L'_{i,0}) + \sum_{j=1}^{N}(L'_{0,j} \cdot L'_{0,j})\right] - \left(\sum_{i=1}^{N} L'_{i,0} + \sum_{j=1}^{N} L'_{0,j}\right) \cdot \left(\sum_{i=1}^{N} L'_{i,0} + \sum_{j=1}^{N} L'_{0,j}\right)} \tag{5}$$

-continued $$\beta = \frac{\left(\sum_{i=1}^{N} C_{i,0} + \sum_{j=1}^{N} C_{0,j}\right) - \alpha \cdot \left(\sum_{i=1}^{N} L'_{i,0} + \sum_{j=1}^{N} L'_{0,j}\right)}{2 \cdot N} \quad (6)$$

Figure 13:
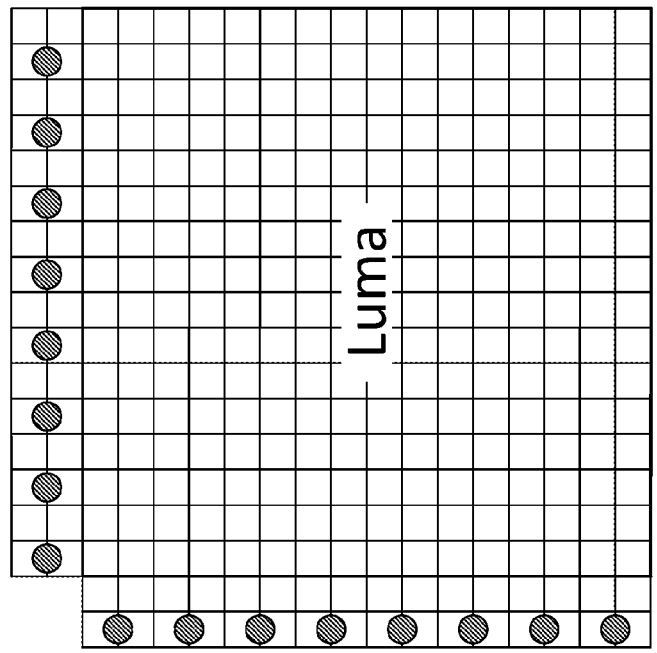
FIG. 13 illustrates example locations of the samples used for derivation of $\alpha$ and $\beta$ in cross-component linear model prediction.
Figure 13:
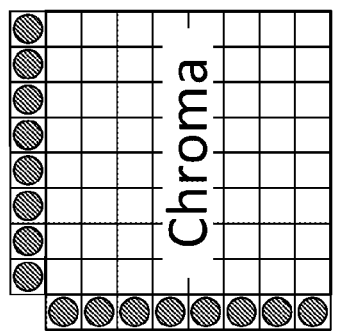

FIG. 13 illustrates example locations of samples used for derivation of α and β in cross-component linear model prediction. For example, FIG. 13 provides the location of the top and left neighboring reconstructed samples used for the derivation of α and β. The neighboring reconstructed samples may be available at the encoder and/or the decoder. The values of α and β may be derived at the encoder and/or the decoder in the same way.

Overlapped block motion compensation may be performed.

Figure 14:
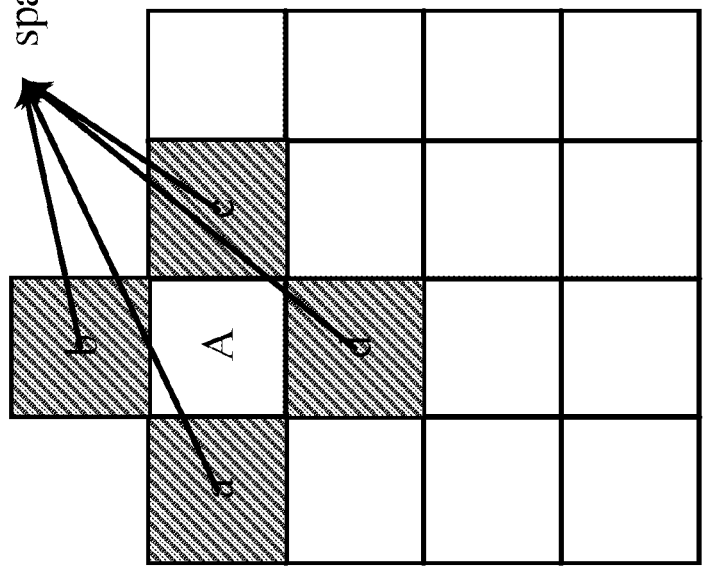
FIG. 14 illustrates an example overlapped block motion compensation.

Overlapped block motion compensation (OBMC) may be used to remove one or more blocking artifacts at motion compensation stage. OBMC may be performed for one or more (e.g., all) inter block boundaries except the right and bottom boundaries of one block. When a video block is coded in a sub-block mode (e.g., advanced temporal motion vector prediction (ATMVP) and/or spatial-temporal motion vector prediction (STMVP)), OBMC may be performed for the sub-block's boundaries (e.g., each of the sub-block's boundaries). FIG. 14 illustrates an example concept of OBMC. When OBMC is applied to a sub-block (e.g., sub-block A in FIG. 14), in addition to the motion vector of the current sub-block, motion vectors of up to four neighboring sub-blocks may be used to derive the prediction signal of the current sub-block. The multiple prediction blocks using the motion vectors of neighboring sub-blocks may be averaged to generate the final prediction signal of the current sub-block.

Weighted average may be used in OBMC to generate the prediction signal of a block. The prediction signal using the motion vector of a neighboring sub-block may be denoted as PN, and the prediction signal using the motion vector of the current sub-block may be denoted as PC. When OBMC is applied, the samples in the first/last four rows/columns of PN may be weighted averaged with the samples at the same positions in PC. The samples to which the weighted averaging is applied may be determined, for example, according to the location of the corresponding neighboring sub-block. For example, when the neighboring sub-block is an above neighbor (e.g., sub-block b in FIG. 14), the samples in the first four rows of the current sub-block may be adjusted. When the neighboring sub-block is a below neighbor (e.g., sub-block d in FIG. 14), the samples in the last four rows of the current sub-block may be adjusted. When the neighboring sub-block is a left neighbor (e.g., sub-block a in FIG. 14), the samples in the first four columns of the current block may be adjusted. When the neighboring sub-block is a right neighbor (e.g., sub-block c in FIG. 14), the samples in the last four columns of the current sub-block may be adjusted. When the current block is not coded in a sub-block mode, one or more weighting factors (e.g., {¼, ⅛, 1/16, 1/32}) may be used for the first four rows/columns of PN, and one or more weighting factors (e.g., {¾, ⅞, 15/16, 31/32}) may be used for the first four rows/columns of PC. When the current block is coded in sub-block mode, the first two rows/columns of PN and PC may be averaged. In this case, one or more weighting factors (e.g., {¼, ⅛}) may be used for PN, and one or more weighting factors (e.g., {¾, ⅞}) may be used for PC.

Local illumination compensation may be performed.

Figure 15:
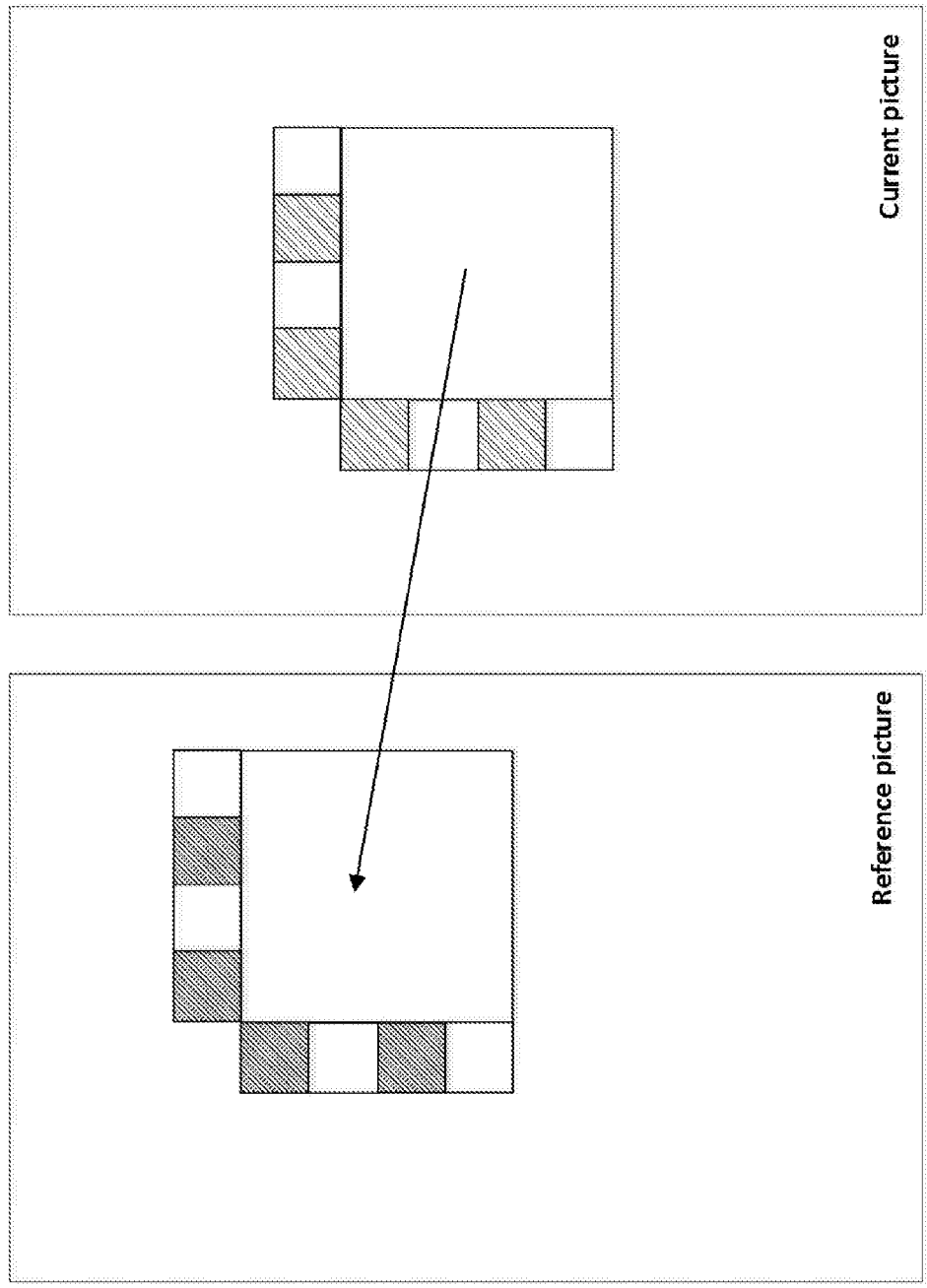
FIG. 15 illustrates an example associated with local illumination compensation.

Illumination compensation (IC) may be based on a linear model for illumination changes, using, for example, a scaling factor a and/or an offset b. IC may be enabled/disabled adaptively for an inter coded block (e.g., each inter coded block). FIG. 15 illustrates an example of IC. As illustrated in FIG. 15, when IC is applied for a block, a least mean square error (LMSE) method may be employed (e.g., to derive the parameters a and b). For example, the parameters a and b may be derived by minimizing distortion between neighboring samples of the current block (e.g., the template) and their corresponding reference samples in the temporal reference picture. As illustrated in FIG. 15, the template may be subsampled (e.g., 2:1 subsampling), which may reduce complexity. As shown in FIG. 15, the shaded samples (e.g., only the shaded samples) may be used to derive a and b.

Figure 16:
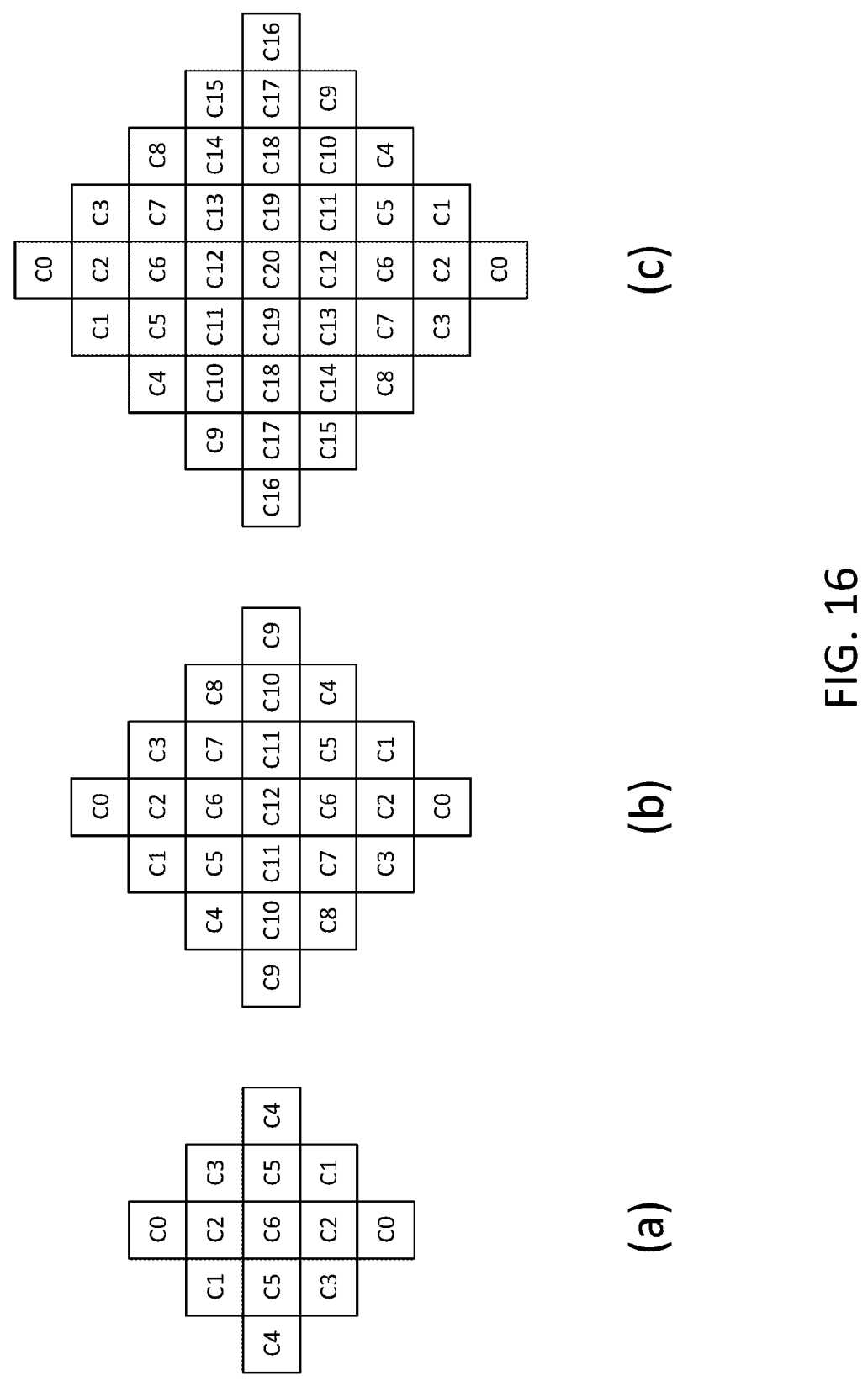

An adaptive loop filter (ALF) may be used. For the luma component, one or more (e.g., up to three) diamond filter shapes may be selected: for example, 5×5, 7×7, and 9×9, as depicted in FIG. 16 (a), (b), and (c), respectively. FIG. 16 illustrates example ALF filter shapes. The selected filter may be signaled at the picture level. For the chroma components, the 5×5 diamond shape may be used (e.g., always used). For the luma component, a 2×2 block (e.g., each 2×2 block) may be classified into one out of 25 categories to select appropriate filter coefficients for that block. No classification may be performed for the chroma components, e.g., one set of coefficients may be used for one or more (e.g., all) chroma samples. The classification may be performed by analyzing the activity and directionality of the gradients in a neighborhood around each 2×2 block. The horizontal, vertical, and two diagonal gradients may be computed using a 1-D Laplacian in a neighborhood of 6×6 samples. One or more (e.g., three) geometric transformations of filter coefficients, e.g., diagonal, vertical flip, and/or rotation, may be applied for each 2×2 block (e.g., depending on the block's gradient values). For the luma component, filtering may be controlled at the CU level, for example by using a flag to signal if ALF is applied or not. For the chroma components, ALF may be enabled or disabled for the whole picture.

Figure 17:
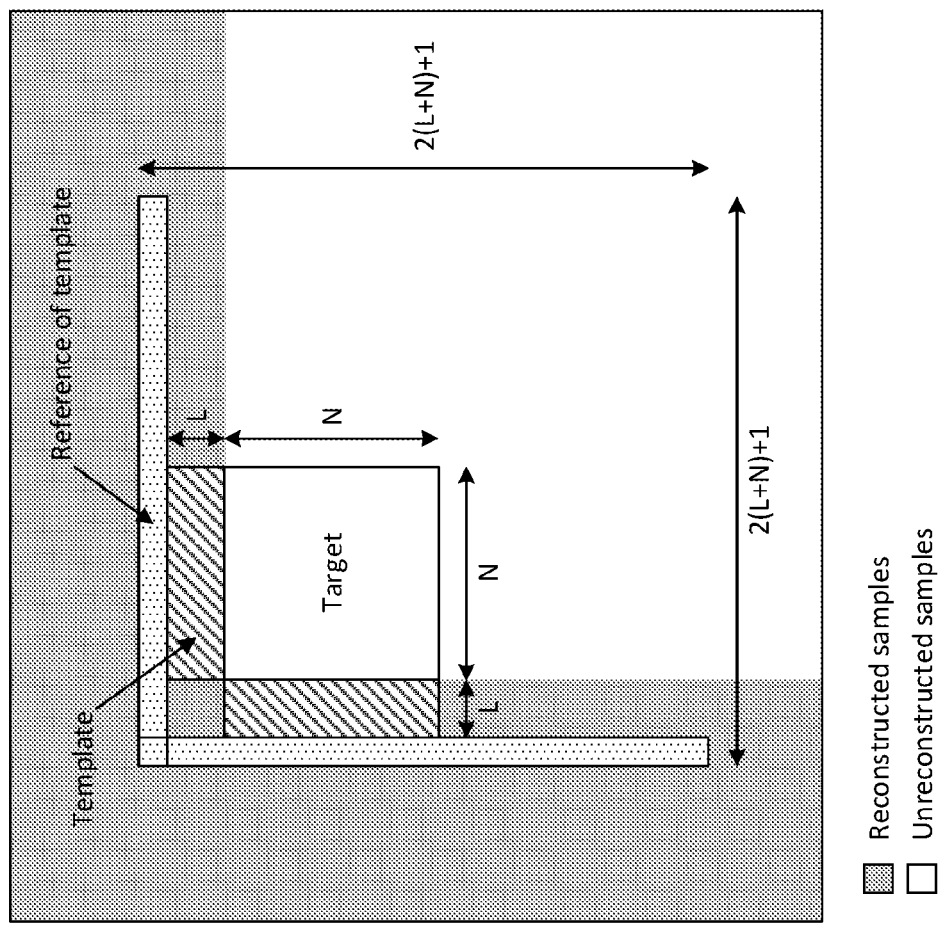
FIG. 17 illustrates an example with target, template, and reference sample in decoder-side intra mode derivation (DIMD).

Decoder-side intra mode derivation (DIMD) may be performed. DIMD may derive information (e.g., at the encoder and/or the decoder) from the neighboring samples of a block (e.g., the neighboring reconstructed samples of one block). FIG. 17 illustrates an example of deriving (e.g., without signaling) intra mode using DIMD. As seen in FIG. 17, a target may denote a block as a current block (e.g., of block size N). An intra mode of the current block may be estimated. The template (e.g., as indicated by the diagonally patterned region in FIG. 17) may indicate a set of samples (e.g., already reconstructed samples). The samples may be used to derive the intra mode. The template's size may be indicated by the number of samples within the template that extends above and to the left of the target block, e.g., L as seen in FIG. 17. A reference of the template (e.g., as indicated by the dotted region in FIG. 17) may be a set of neighboring samples. The neighboring samples may be located above and to the left of the template. For intra prediction mode (e.g., each intra prediction mode), DIMD may calculate the sum of absolute differences (SAD) between the reconstructed template samples and its prediction samples. The prediction samples may be obtained from the reference samples of the template. The intra prediction mode that yields the minimum SAD may be selected as the intra prediction mode of a block (e.g., the final intra prediction mode of the target block).

For geometries composed of different faces (e.g., CMP, octahedron projection (OHP), icosahedral projection (ISP), and/or the like), one or more discontinuities may appear between two or more adjacent faces in a frame-packed picture (e.g., regardless of the compact face arrangement). For example, FIG. 2(c) illustrates an example 3×2 CMP. In FIG. 2(c), the 3 faces in the top half may be horizontally continuous in 3D geometry. The 3 faces in the bottom half may be horizontally continuous in 3D geometry. The top half and bottom half may be discontinuous in 3D geometry. For 360-degree video, because of discontinuities, a neighboring block in the frame-packed picture may not necessarily be relevant.

Figure 18:
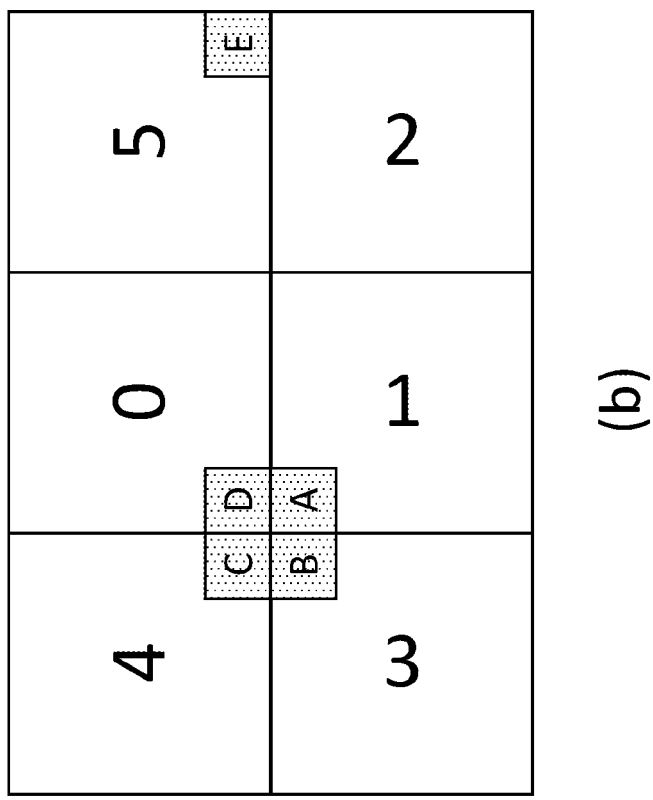
FIG. 18 illustrates example CMP: (a) 3D representation; and (b) 3×2 frame-packing configuration.
Figure 18:
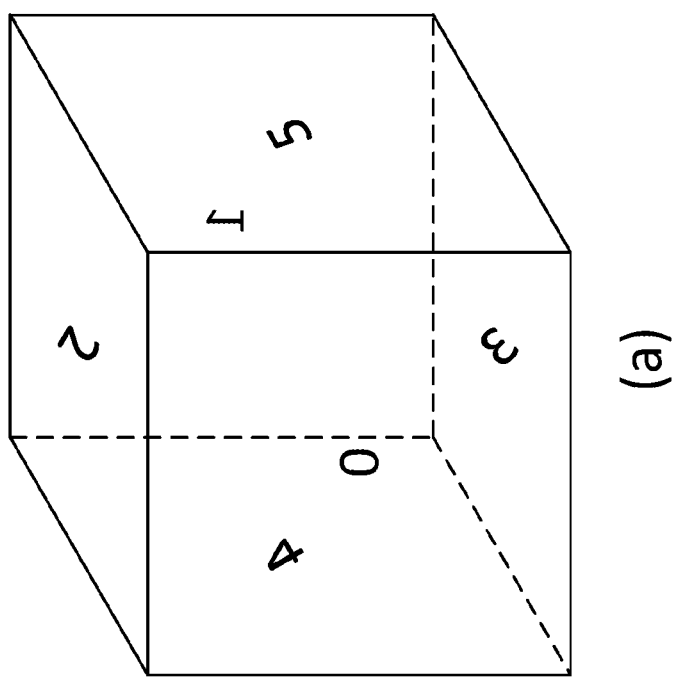

FIG. 18 illustrates an example of CMP. FIG. 18(a) illustrates an example 3D representation of the CMP. FIG. 18(b) illustrates an example 3×2 frame-packing configuration of the CMP. As shown in FIG. 18(a) and/or (b), block D may be the frame-packed neighbor located above block A. A frame-packed neighbor may be or may include a block that neighbors the current block in the frame-packed picture. A spherical neighbor may be or may include a block that neighbors the current block in 3D geometry. A frame-packed neighbor may also be a spherical neighbor. Considering the 3D geometry, block E may be the spherical neighbor located above block A. If video codec(s) designed for 2D video is used, the frame-packed neighbor D may be used to predict the current block A, for example, in the form of intra prediction, intra MPM, merge mode, motion vector prediction, and/or the like. Information from D may not be appropriate to predict A (e.g., due to the inherent discontinuity between D and A) and may degrade coding efficiency. A spherical neighbor (e.g., block E) may be used when deriving relevant coding information (e.g., intra mode, motion vector, reference samples, and/or the like) to predict the current block (e.g., block A).

The spherical neighbors may be derived. For example, the spherical neighbors may be derived at the sample level (e.g., to derive reference samples for intra prediction and/or for a cross-component linear model). 2D to 3D geometry and/or 3D to 2D geometry conversions may be applied to derive the spherical neighbors. A look-up-table (LUT) may be used to pre-store the locations of spherical neighbors.

CTUs in a current picture/slice/tile may be processed in raster scan order. Information from a limited number of frame-packed neighboring blocks may be buffered (e.g., using a cache). When spherical neighbors are considered, the reference sample and/or coding information may be far from the current block in raster scan order. For example, block E from FIG. 18(b) may be farther from A in raster scan order than blocks B, C, and D. The information from block E may be removed from the cache before block A is coded.

A frame-packed neighbor block may be used to predict the current block in 360-degree video coding when (e.g., only when) the frame-packed neighbor block is the spherical neighbor block of the current block. For the example depicted in FIG. 18(a)-(b), block B may be a frame-packed and spherical neighbor with respect to block A, whereas blocks C and D may be frame-packed neighbors to block A, but not spherical neighbors of block A. Inferring information across face discontinuities may be disabled.

The left (L), above (A), above right (AR), above left (AL), and below left (BL) neighbors may be used to infer information (e.g., because of raster scan processing) in 2D video coding (e.g., see FIG. 8 and FIG. 10). If the current block is located on the right side of a face discontinuity, the left, above left, and/or below left frame-packed neighbor blocks may be located on the other side of the face discontinuity and may be considered as unavailable for inferring attributes, e.g., for deriving the list of most probable modes in intra prediction, for deriving motion vector candidates in motion vector prediction and/or merge mode, OBMC, and/or the like. Similar considerations may be applied to a current block which may be located on the left side of, above, and/or below a face discontinuity. In this way, non-relevant spatial candidates may be excluded when inferring attributes from neighboring blocks.

Reconstructed samples located above and/or on the left of the current block may be used in 2D video coding (e.g., because of raster scan processing) for predicting the current block (e.g., see FIG. 6 and FIG. 13). If the current block is located on the right side of a face discontinuity, the reconstructed samples located on the left side of the block, e.g., $R_{0,0} \ldots R_{0,2N}$ (e.g., see FIG. 6 and FIG. 13), may be located on the other side of the face discontinuity and may not correlate with the current block samples. In this case, the reconstructed samples may be considered as unavailable in one or more prediction approaches, e.g., DC, planar, and/or angular modes in intra prediction, cross-component linear model prediction, OBMC, and/or in-loop filtering. In this way, poorly correlated reconstructed samples may be excluded when predicting and/or filtering the current block using neighboring reconstructed samples.

Reconstructed samples and/or coding information from spatial neighbors across face discontinuities may be discounted.

The techniques described herein may be applied to a face discontinuity and/or a face continuity, e.g., a boundary between two faces in the frame-packed picture that are also neighboring faces in 3D geometry.

Face discontinuities in a frame-packed picture may be determined. In examples, frame-packing information may be signaled in the bit stream to identify one or more faces (e.g., each face) in the frame-packed picture. For one or more (e.g., every) pair of neighboring faces in the frame-packed picture, the shared edge may be defined as continuous if the two faces share the same edge in 3D geometry. If the two faces do not share the same edge in 3D geometry, this edge may be defined as discontinuous.

For example, a frame-packed picture may contain M×N faces (e.g., in FIG. 2 (b), M=3 and N=2), (M−1)×N vertical edges may exist between faces in the picture, and M×(N−1) horizontal edges may exist between faces in the picture. A total of (M−1)×N+M×(N−1) flags may be signaled, for example to specify whether an edge is continuous or not, as shown in Table 1. The edges may be scanned in a specific order, e.g., from top to bottom and from left to right. Table 1 may illustrate this set of syntax elements being placed in Video Parameter Set. Other sequence level parameter sets, such as Picture Parameter Set (PPS) or Sequence Parameter Set (SPS) may be used to carry this information.

TABLE 1

| Video parameter set RBSP | Descriptor |
|---|---|
| video_parameter_set_rbsp( ) { | |
| ... | |
|   face_discontinuity_param_present_flag | u(1) |
|   if( face_discontinuity_param_present_flag ) { | |
|     num_face_rows | ue(v) |
|     num_face_columns | ue(v) |
|     for( i = 0; i < (num_face_rows−1)*num_face_columns + num_face_rows*(num_face_columns−1); i++ ) { | |
|       face_discontinuity_flag[ i ] | u(1) |
|     } | |
|   } | |
| ... | |
| } | |

In Table 1, the parameter face_discontinuity_param_present_flag may specify whether one or more of the syntax elements num_face_rows, num_face_columns, and face_discontinuity_flag[i] are present. When the parameter face_discontinuity_param_present_flag is not present in the bitstream, the value of the parameter may be inferred to be a value that indicates that the face discontinuity parameters are absent (e.g., 0).

The parameter num_face_rows may specify the number of face rows in the frame-packed picture. When the parameter num_face_rows is not present in the bitstream, the value of the parameter may be set to a default value (e.g., 1).

The parameter num_face_columns may specify the number of face columns in the frame-packed picture. When the parameter num_face_columns is not present in the bitstream, the value of the parameter may be set to a default value (e.g., 1).

Parameters num_face_rows_minus1 and/or num_face_columns_minus1 may be signaled (e.g., instead of and/or in addition to signaling num_face_rows and num_face_columns) to reduce the number of bits to code the syntax elements.

Parameter face_discontinuity_flag[i] may specify whether the i-th face edge is discontinuous or not.

In examples, coordinates of the two endpoints of one or more face discontinuities (e.g., each face discontinuity) in the frame-packed picture may be signaled (e.g., signaled explicitly). Endpoints for horizontal and/or vertical discontinuities may be signaled. Endpoints for diagonal discontinuities may be signaled. Diagonal discontinuities may be used, for example, for triangular based geometries (e.g., OHP and/or ISP). Table 2 illustrates example syntax elements at the video level.

TABLE 2

Video parameter set RBSP

| | Descriptor |
|---|---|
| video_parameter_set_rbsp( ) { | |
| ... | |
|   face_discontinuity_param_present_flag | u(1) |
|   if( face_discontinuity_param_present_flag ) { | |
|     num_face_discontinuities | ue(v) |
|     for( i = 0; i < num_face_discontinuities; i++ ) { | |
|       face_discontinuity_start_point_x[ i ] | ue(v) |
|       face_discontinuity_start_point_y[ i ] | ue(v) |
|       face_discontinuity_end_point_x[ i ] | ue(v) |
|       face_discontinuity_end_point_y[ i ] | ue(v) |
|     } | |
|   } | |
| ... | |
| } | |

In Table 2, the parameter face_discontinuity_param_present_flag may specify whether one or more of the syntax elements num_face_discontinuities, face_discontinuity_start_point_x, face_discontinuity_start_point_y, face_discontinuity_end_point_x, and/or face_discontinuity_end_point_y are present. When the parameter face_discontinuity_param_present_flag is not present in the bitstream, the value of the parameter may be inferred to be a value that indicates that the face discontinuity parameters are absent (e.g., 0).

The parameter num_face_discontinuities may specify the number of face discontinuities in the frame-packed picture. When the parameter num_face_discontinuities is not present in the bitstream, the value of the parameter may be be set to a default value (e.g., 1). A parameter num_face_discontinuities_minus1 may be signaled (e.g., instead of and/or in addition to signaling num_face_discontinuities). The value of the parameter num_face_discontinuities_minus1 may be the number of face discontinuities in the frame-packed picture minus one.

The parameter face_discontinuity_start_point_x[i] may specify the x coordinate in the frame-packed picture of the start point of the i-th face discontinuity. The value of the parameter face_discontinuity_start_point_x[i] may be in the range of 0 to picture_width-1 (e.g., inclusively).

The parameter face_discontinuity_start_point_y[i] may specify the y coordinate in the frame-packed picture of the start point of the i-th face discontinuity. The value of the parameter face_discontinuity_start_point_x[i] may be in the range of 0 to picture_height-1 (e.g., inclusively).

The parameter face_discontinuity_end_point_x[i] may specify the x coordinate in the frame-packed picture of the end point of the i-th face discontinuity. The value of the parameter face_discontinuity_start_point_x[i] may be in the range of 0 to picture_width-1 (e.g., inclusively).

The parameter face_discontinuity_end_point_y[i] may specify the y coordinate in the frame-packed picture of the end point of the i-th face discontinuity. The value of the parameter face_discontinuity_start_point_x[i] may be in the range of 0 to picture_height-1 (e.g., inclusively).

One or more of the parameters defined at the video level may be signaled (e.g., signaled instead of and/or in addition) at the sequence and/or picture level, for example if the projection geometry and/or frame-packing is changed during the video encoding. Fixed length coding of the syntax elements may be used (e.g., instead of ue(v)). The bit length of the syntax elements may be determined by ceil(log 2(picture_width)) or ceil(log 2(picture_height)).

If one or more exemplary approaches described herein are used, a list of face discontinuities may be generated. For example, K vertical face discontinuities and L horizontal face discontinuities may be identified. A list of (K+L) face discontinuities may be split into two lists: a list of K vertical face discontinuities, which may be denoted as $D_v$, and a list of L horizontal face discontinuities, which may be denoted as $D_h$. For a face discontinuity d, its two endpoints in the frame-packed picture, which may be denoted as $A_d$ and $B_d$ may be determined. A block may be identified by its upper left coordinate, which may be denoted as C, its width, which may be denoted as W, and its height, which may be denoted as H. To check if a horizontal discontinuity is located above the block, a horizontal face discontinuity check may be performed as shown in Table 3.

TABLE 3

An example approach to check discontinuity discontinuity = false
foreach d ∈ $D_h$ do
  if $A_{d,y}$ = $C_y$ and min($A_{d,x}$, $B_{d,x}$) ≤ $C_x$ + W and max($A_{d,x}$, $B_{d,x}$) ≥ $C_x$ then
    discontinuity = true
    break
end A similar approach may be used to determine if a discontinuity is located below, on the left side of, and/or on the right side of a block. A similar approach may be used to determine if a discontinuity is located near a particular sample position.

A frame-packing arrangement may be determined at a high level (e.g., a sequence level or picture level). Face discontinuities may be determined at the high level and may remain the same through multiple pictures. An array may be pre-calculated at a given granularity to store whether a discontinuity exists for a block. For example, if the array is defined at the block level, a face discontinuity flag may be calculated for each block and may be stored in the array. The block may be of a pre-determined size, for example 4×4. Whether a discontinuity exists during encoding/decoding for the current block may be determined.

Figure 2B:
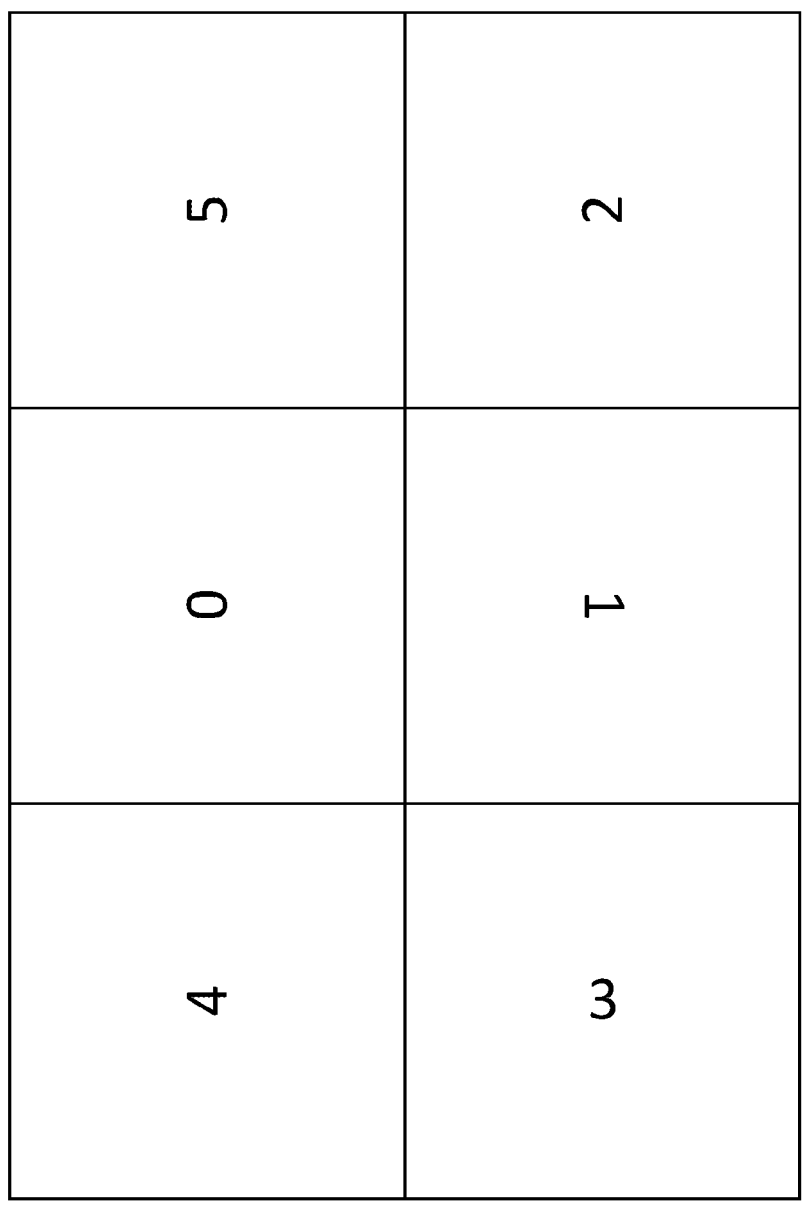
Figure 2C:
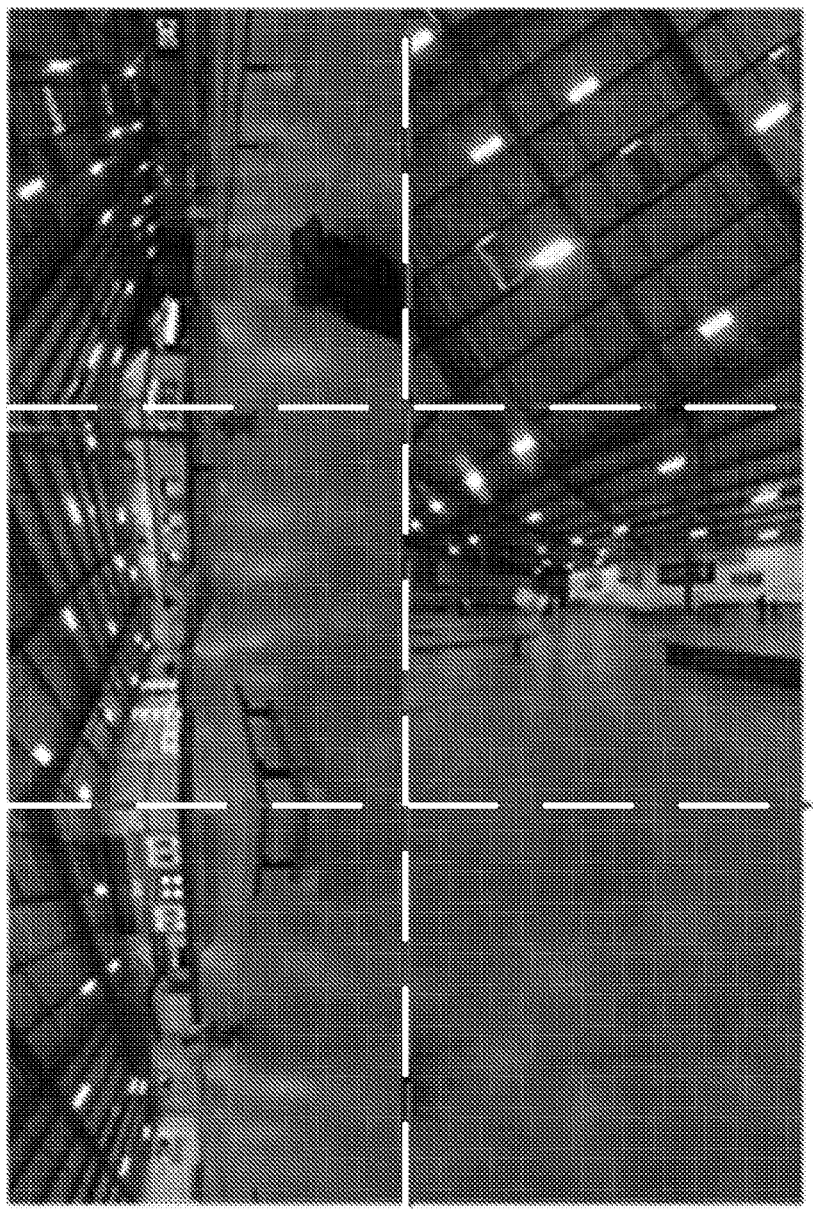

FIG. 2(b) illustrates an example 3×2 cubemap frame-packing. In FIG. 2(c), a horizontal discontinuity may occur in the middle of the picture, and there may be no vertical discontinuities. Blocks that adjoin the discontinuity line and/or samples that lie on top of the discontinuity line may have the discontinuity flag set to true. One or more other blocks (e.g., all other blocks) and/or samples may have the discontinuity flag set to false.

The positions of face boundaries (e.g., the positions of all the face boundaries inside a frame-packed picture) may be signaled. The positions of discontinuous face boundaries inside a frame-packed picture may be signaled (e.g., may only be signaled). A flag may be signaled for a face boundary (e.g., each face boundary). The flag may indicate whether the face boundary is continuous or discontinuous.

Spatial candidates at face discontinuities may be identified.

Information may be inferred from neighboring blocks, e.g., for most probable mode in intra prediction, spatial-temporal motion vector prediction (STMVP), OBMC, and/or merge mode in inter prediction. The neighboring blocks may be spatial neighboring blocks or temporal neighboring blocks. Whether a current block is located at a face discontinuity may be determined, e.g. based on the location of the current block. A coding availability of a neighboring block may be determined, e.g., based on whether the neighboring block is on the same side of the face discontinuity as the current block. Frame-packed neighbors that are not spherical neighbors of a current block (e.g., neighboring blocks that are not on the same side of the face discontinuity as the current block) may be considered unavailable for decoding the current block. Frame-packed neighbors that are spherical neighbors of the current block (e.g., neighboring blocks that are on the same side of the face discontinuity as the current block) may be considered available for decoding the current block.

A decoding function may be performed on the current block, for example based on the coding availability of the neighboring block. The decoding function may include deriving a merge mode for the current block. For example, if the neighboring block is determined to be available, the neighboring block may be added to a merge candidate list (e.g., a list of candidate blocks). The neighboring block may be excluded from the merge candidate list if the neighboring block is determined to be unavailable.

Figure 19:
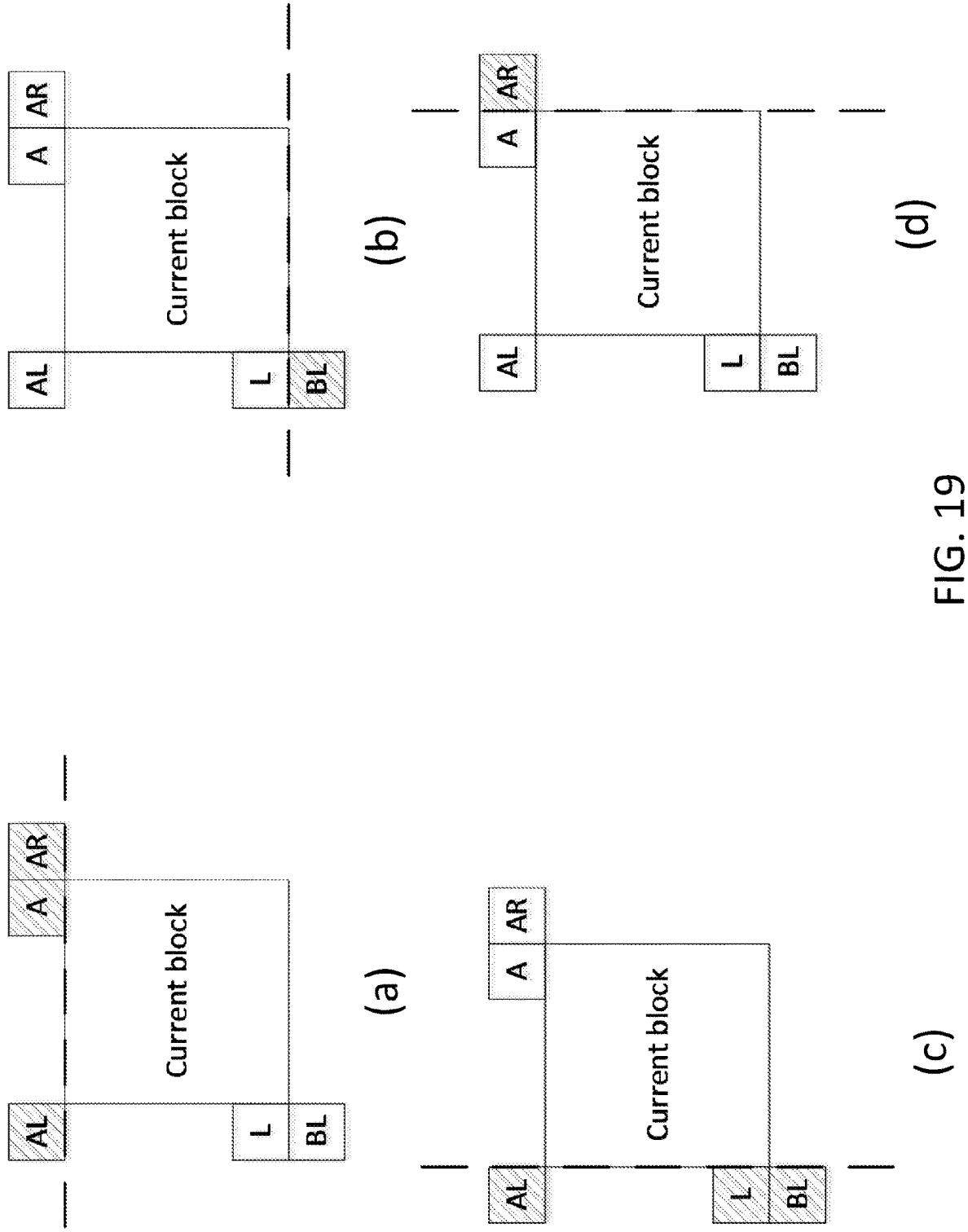
FIG. 19 illustrates example availability of spatial neighbors when a face discontinuity is located: (a) above; (b) below; (c) on the left; or (d) on the right of the current block.

FIG. 19 illustrates examples availability of spatial neighbors when a face discontinuity is located above (e.g., FIG. 19(a)), below (e.g., FIG. 19(b)), on the left of (e.g., FIG. 19(c)), and/or on the right of (e.g., FIG. 19(d)) a current block. Blocks depicted in FIGS. 19(a)-(d) using a hatched pattern may be located on the other side of the face discontinuity and may be considered unavailable (e.g., determined to be unavailable for decoding the current block). For example, if a face discontinuity is located above the current block, the above left, above, and/or above right neighboring blocks may be considered unavailable, as depicted in FIG. 19(a). If a face discontinuity is located below the current block, the below left neighboring block may be considered unavailable, as depicted in FIG. 19(b). If a face discontinuity is located on the left side of the current block, the above left, left, and/or below left neighboring blocks may be considered unavailable, as depicted in FIG. 19(c). If a face discontinuity is located on the right side of the current block, the above right neighboring block may be considered unavailable, as depicted in FIG. 19(d).

Whether reconstructed samples at face discontinuities may be used for predicting the current block may be determined, e.g. based on the location of the current block. Whether a current block is located at a face discontinuity may be determined. A coding availability of a reconstructed sample may be determined, e.g., based on whether the reconstructed sample is on the same side of the face discontinuity as the current block. One or more reconstructed samples that are located on the other side of the face discontinuity that the current block adjoins may be considered unavailable (e.g., unavailable for decoding the current block). One or more reconstructed samples that are located on the same side of the face discontinuity that the current block adjoins may be considered available (e.g., available for decoding the current block). Reconstructed samples considered unavailable may be padded using available reconstructed samples. For example, a reconstructed sample considered unavailable may be replaced with one or more available reconstructed samples.

Figure 20A:
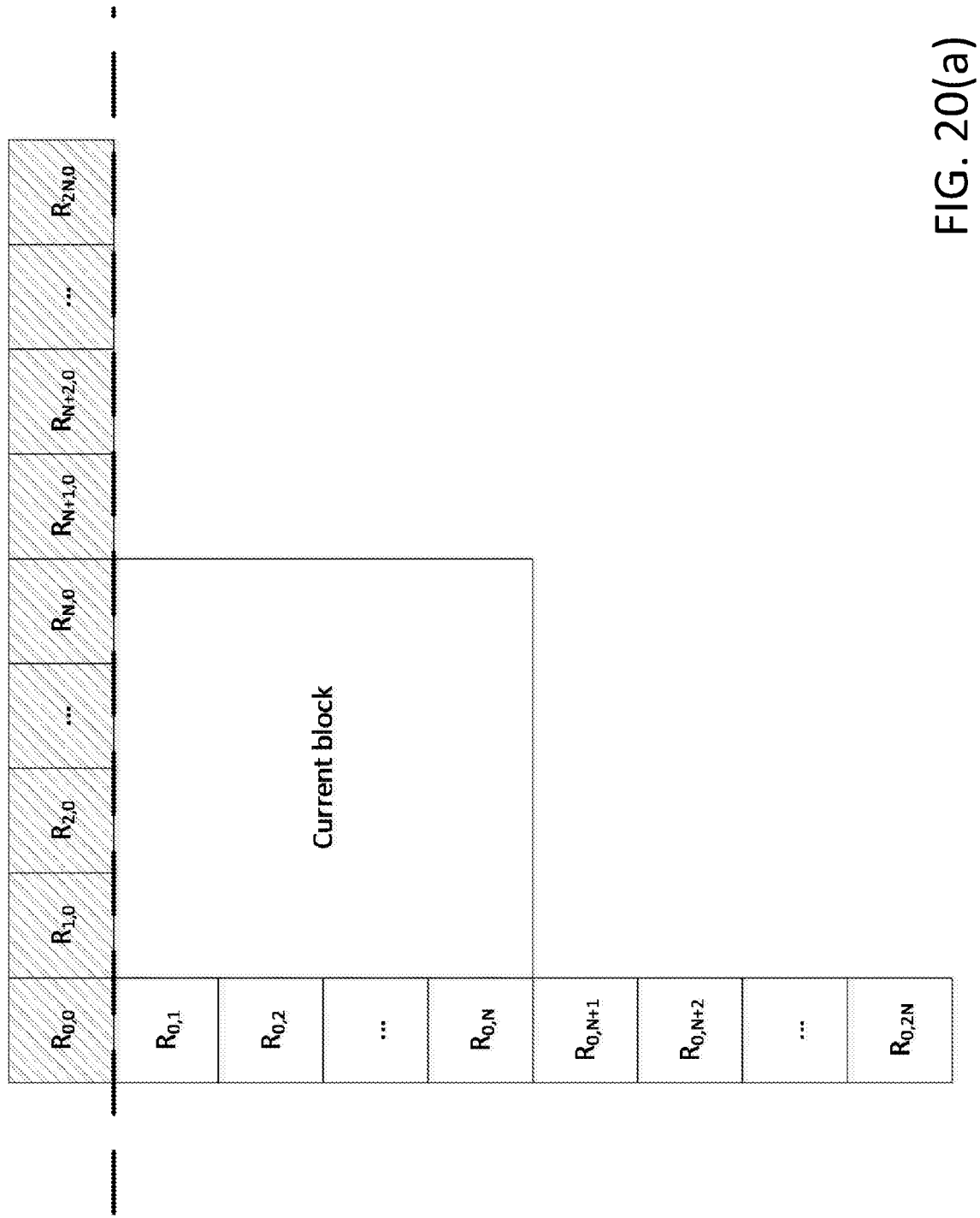
FIG. 20 illustrates example availability of reconstructed samples when a face discontinuity is located: (a) above; (b) below; (c) on the left; or (d) on the right of the current block.
Figure 20B:
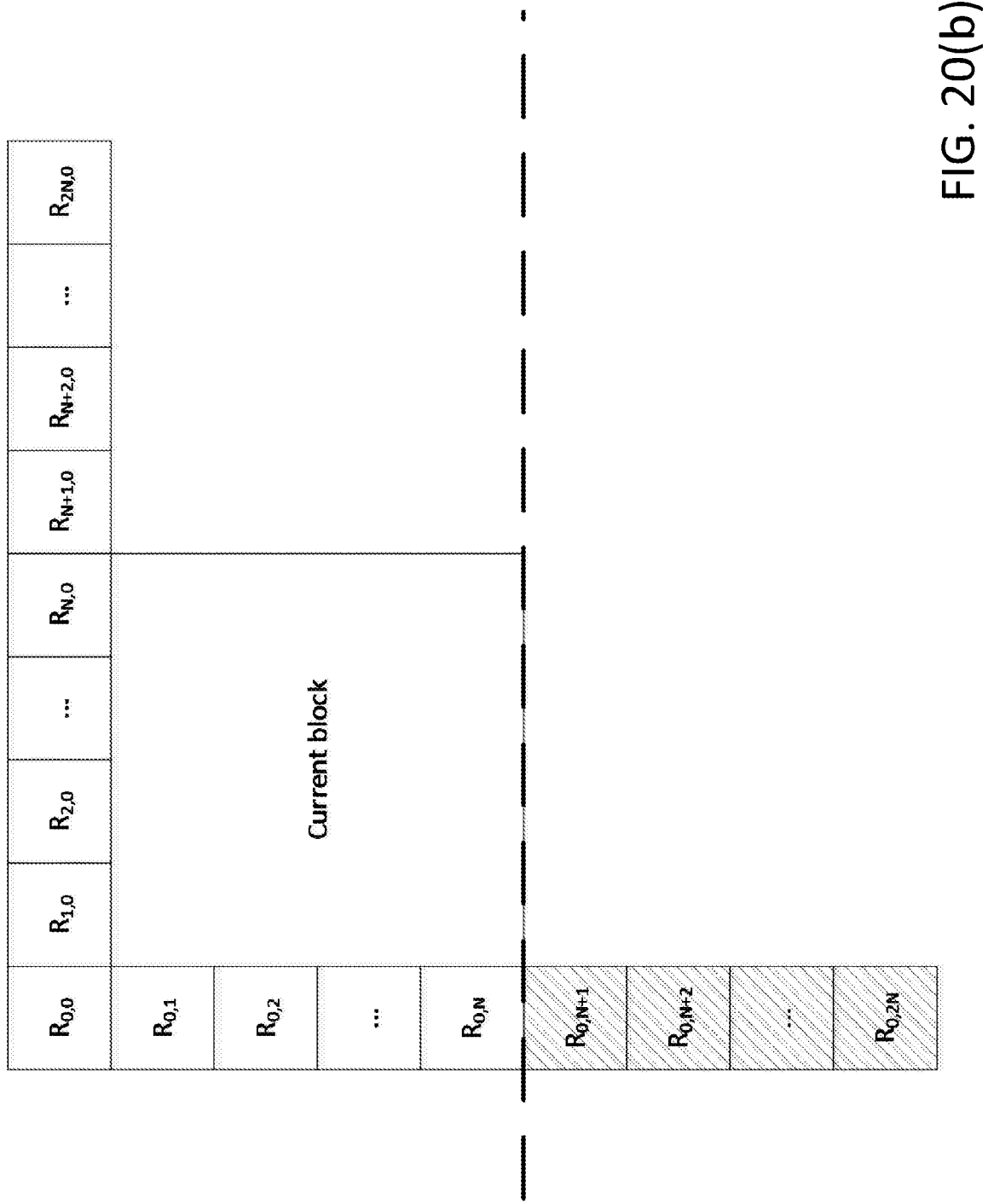

FIG. 20 illustrates examples availability of reconstructed samples when a face discontinuity is located above (e.g., FIG. 20(a)), below (e.g., FIG. 20(b)), on the left of (e.g., FIG. 20(c)), and/or on the right of (e.g., FIG. 20(d)) a current block. The reconstructed samples depicted in FIGS. 20(a)-(d) using a hatched pattern may be located on the other side of the face discontinuity and may be considered unavailable (e.g., determined to be unavailable for decoding the current block). For example, if a face discontinuity is located above the current block, the reconstructed samples located above the current block (e.g., $R_{0,0} \ldots R_{2N,0}$) may be considered unavailable, as depicted in FIG. 20(a). If a face discontinuity is located below the current block, the reconstructed samples located below the current block (e.g., $R_{0,N+1} \ldots R_{0,2N}$) may be considered unavailable, as depicted in FIG. 20(b). If a face discontinuity is located on the left side of the current block, the reconstructed samples located on the left side of the current block (e.g., $R_{0,0} \ldots R_{0,2N}$) may be considered unavailable, as depicted in FIG. 20(c). If a face discontinuity is located on the right side of the current block, the reconstructed samples located on the right side of the current block (e.g., $R_{N+1,0} \ldots R_{2N,0}$) may be considered unavailable, as depicted in FIG. 20(d).

More than one reference sample line may be used in one or more cases described herein, and the same approach may be applied for rectangular blocks.

Certain implementation (e.g., cross-component linear model prediction, IC, etc.) may be disabled (e.g., completely disabled) if the reconstructed samples (e.g., all the reconstructed samples) used do not belong to the same face. For example, if a face discontinuity crosses a current block and/or one or more samples of the current block belong to a different face from that of the template, IC may be disabled (e.g., completely disabled). Disabling IC may avoid scaling and/or offsetting a block using reconstructed samples that are located in different faces.

Motion compensation may be performed at face discontinuities. Inter prediction modes (e.g., FRUC, alternative temporal motion vector prediction (ATMVP), spatial-temporal motion vector prediction (STMVP), and/or affine motion compensated prediction) may employ sub-block based motion vector prediction. For example, if a group of sub-blocks have the same motion information, motion compensation may be applied (e.g., directly) to the group of sub-blocks (e.g., the entire group of sub-blocks). If one or more sub-blocks are merged into a larger sub-block-group (e.g., as a motion compensation unit), sub-blocks that belong to the same face may be merged together.

Figure 21B:
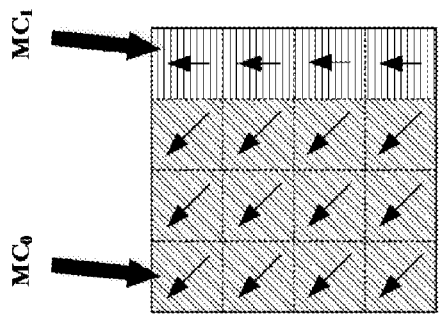
FIG. 21 illustrates an example comparison of: (a) sub-block based motion compensation, (b) sub-block based motion compensation with sub-block merging, and (c) sub-block based motion compensation with sub-block merging near face discontinuities.
Figure 21A:
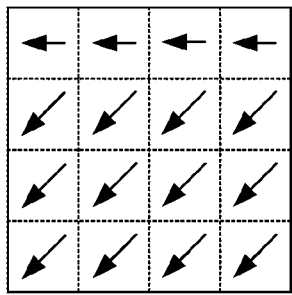
Figure 21C:
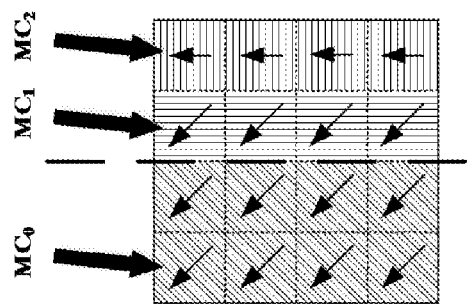

Motion compensation may be applied separately (e.g., on each side of a face discontinuity) and/or jointly. As illustrated in FIGS. 21 (*a*)-(*c*), if a coding block is crossed by a face discontinuity and one or more sub-blocks (e.g., all sub-blocks) on one side of the block have the same motion information, motion compensation may be applied separately (e.g., corresponding to MC0 and MC1 in FIG. 21 (*c*)). For example, motion compensation may be applied separately to one or more groups on each side of the face discontinuity. As illustrated in FIGS. 21 (*a*)-(*c*), if a coding block is not crossed by a face discontinuity, and one or more sub-blocks (e.g., all sub-blocks) on one side of the block have the same motion information, motion compensation may be applied jointly (e.g., corresponding to MC0 in FIG. 21 (*b*)). For example, motion compensation may be applied jointly for each side of the coding block.

Motion compensation may be applied considering the face to which the merged sub-blocks belong. For example, if geometry padding is used, motion compensation may be applied using a corresponding padded face. Motion compensation using the corresponding padded face may derive one or more reference samples for interpolation.

Figure 22B:
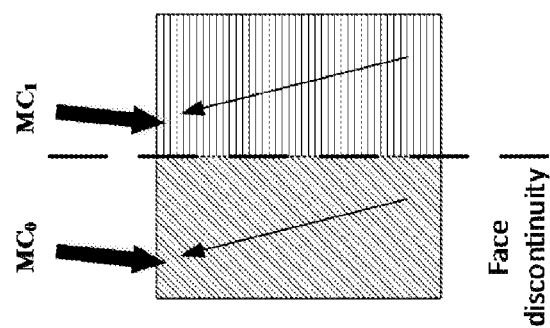
FIG. 22 illustrates an example comparison of: (a) motion compensation, and (b) motion compensation near face discontinuities.
Figure 22A:
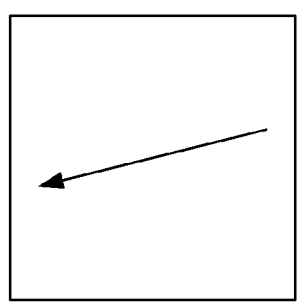
Figure 23A:
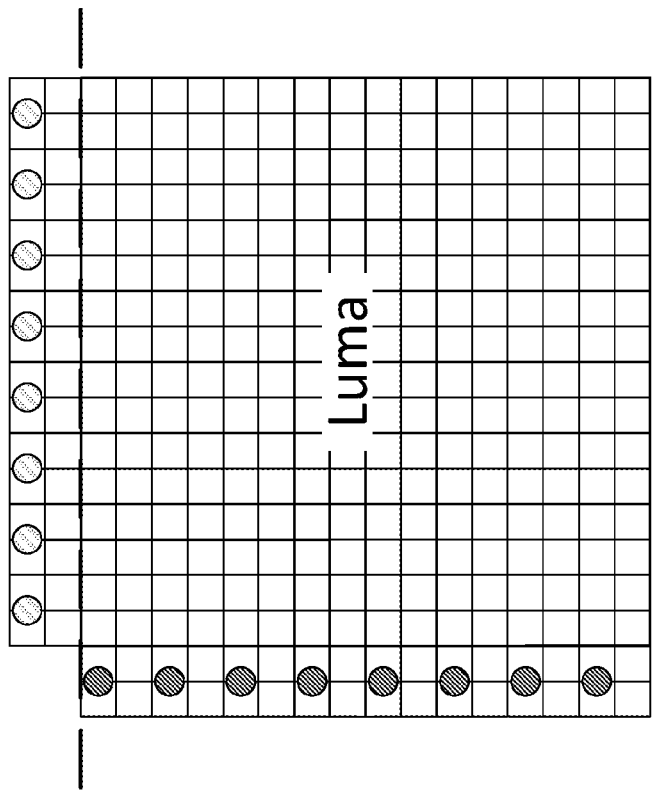
FIG. 23 illustrates example availability of the reconstructed samples used for cross-component linear model prediction when a face discontinuity is located: (a) above; or (b) on the left of the current block.
Figure 23A:
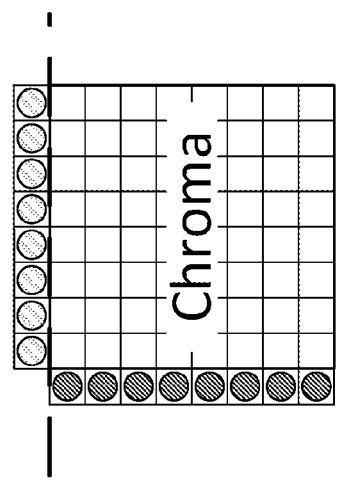
Figure 23B:
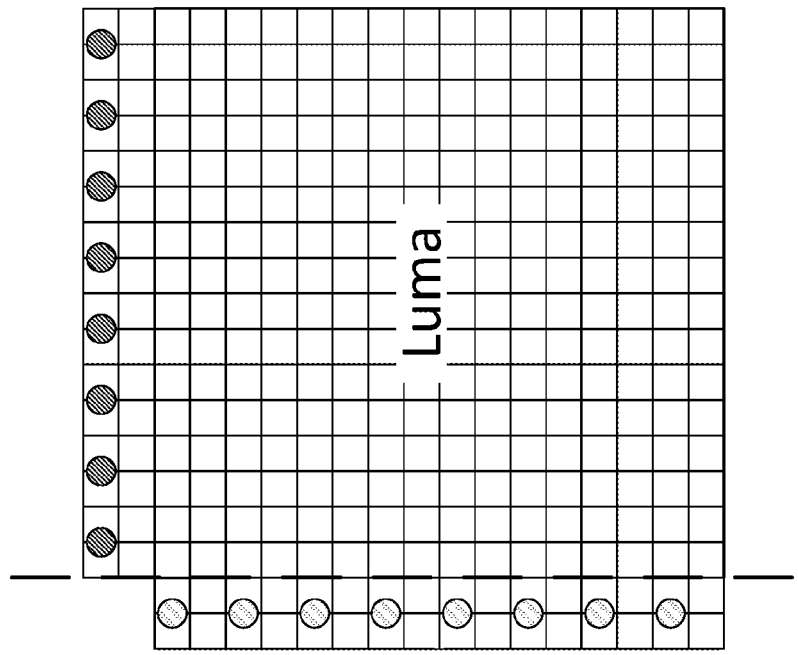
Figure 23B:
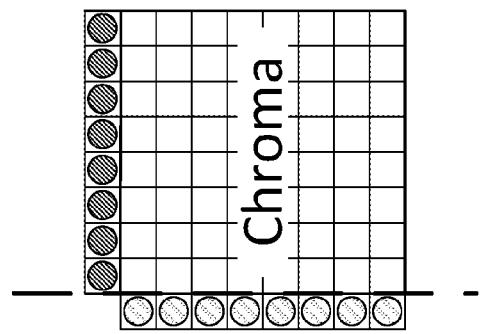

If a face discontinuity crosses a block/sub-block and that block/sub-block has one motion vector, motion compensation may be split into two or more motion compensation processes. For example, when face based geometry padding is applied, motion compensation may be performed on a side (e.g., each side) of the face discontinuity. This technique may be similar to the concepts used for coding units and/or prediction units. For example, whether a face discontinuity crosses the current coding unit (e.g., current block) may be determined. The current coding unit may be split into one or more prediction units (e.g., one on each side of the face discontinuity). The prediction units may be used to perform motion compensated prediction. For example, motion compensation may be performed for each prediction unit separately. As illustrated in FIGS. 22 (*a*) and (*b*), if a coding unit is crossed by a face discontinuity, motion compensation may be applied separately (e.g., corresponding to MC0 and MC1, in FIG. 22 (*b*)). For example, motion compensation may be applied separately to a prediction unit on each side of the face discontinuity. As illustrated in FIGS. 22 (*a*) and (*b*), if a coding unit is not crossed by a vertical and/or horizontal face discontinuity, motion compensation may be applied jointly (e.g., corresponding to MC0 in FIG. 22 (*a*)). For example, motion compensation may be applied jointly for each side of the prediction unit.

Partitioning may be applied based on a face discontinuity. For example, the partitioning may be implicit and/or explicit. The partitioning may align a block boundary with a face discontinuity, which may avoid the block being crossed by a face discontinuity.

Cross-component linear model prediction (CCLMP) at face discontinuities may be performed. Whether to enable or disable CCLMP may be determined for a block based on, for example, the location of the block For cross-component linear model prediction, the correlation between reconstructed and current block samples may be improved. For example, one or more reconstructed samples may be used for estimating parameters of a linear model. Reconstructed samples that are located on the other side of a face discontinuity which a current block adjoins may be discarded.

FIG. 23 illustrates examples availability of reconstructed samples used for cross-component linear model prediction when a face discontinuity is located above (e.g., FIG. 23 (*a*)) or on the left of (e.g., FIG. 23 (*b*)) the current block. Reconstructed samples depicted using a hatched pattern may be located on the other side of the face discontinuity and may be considered unavailable (e.g., determined to be unavailable for decoding the current block). For example, if a face discontinuity is located above the current block, the reconstructed samples located above the current block may be discarded (e.g., not used to predict the parameters of the linear model), as depicted in FIG. 23(*a*). In this case, the linear model parameters may be computed as shown in Equations (7) and (8):

$$\alpha = \frac{N \cdot \Sigma_{j=1}^{N}(L'_{0,j} \cdot C_{0,j}) - \Sigma_{j=1}^{N} L'_{0,j} \cdot \Sigma_{j=1}^{N} C_{0,j}}{N \cdot \Sigma_{j=1}^{N}(L'_{0,j} \cdot L'_{0,j}) - \Sigma_{j=1}^{N} L'_{0,j} \cdot \Sigma_{j=1}^{N} L'_{0,j}} \quad (7)$$

$$\beta = \frac{\Sigma_{j=1}^{N} C_{0,j} - \alpha \cdot \Sigma_{j=1}^{N} L'_{0,j}}{N} \quad (8)$$

If a face discontinuity is located on the left side of the current block, the reconstructed samples located on the left side of the current block may be discarded (e.g., not used to predict the parameters of the linear model), as depicted in FIG. 23(*b*). In this case, the linear model parameters may be computed as shown in Equations (9) and (10):

$$\alpha = \frac{N \cdot \Sigma_{i=1}^{N}(L'_{i,0} \cdot C_{i,0}) - \Sigma_{i=1}^{N} L'_{i,0} \cdot \Sigma_{i=1}^{N} C_{i,0}}{N \cdot \Sigma_{i=1}^{N}(L'_{i,0} \cdot L'_{i,0}) - \Sigma_{i=1}^{N} L'_{i,0} \cdot \Sigma_{i=1}^{N} L'_{i,0}} \quad (9)$$

$$\beta = \frac{\Sigma_{i=1}^{N} C_{i,0} - \alpha \cdot \Sigma_{i=1}^{N} L'_{i,0}}{N} \quad (10)$$

If a face discontinuity is located above and/or on the left side of the current block, the reconstructed samples located above and/or on the left side of the current block may be located on the other side of the face discontinuity, and cross-component linear model prediction may be disabled for that block.

The same principle as described herein may be applied for rectangular blocks (e.g., without having to subsample the longer boundary to have the same number of samples as the shorter boundary). Cross-component linear model prediction described herein may be used to predict between two chroma components (e.g., in the sample domain or in the residual domain). One or more cross-component linear models may be used, where a cross-component linear model prediction may be defined for a specific range of sample values and applied as described herein.

Reconstructed samples located on the other side of the face discontinuity which the current block adjoins may be considered unavailable (e.g., instead of being discarded) and may be padded using one or more available reconstructed samples.

Decoder-side intra mode derivation (DIMD) may be performed at face discontinuities. A template may be discarded (e.g., marked as unavailable) in a DIMD search if part or all of the samples (e.g., reconstructed samples) from the template and/or part or all of the reference samples used to predict the template are located on the other side of the face discontinuity that the current block adjoins (e.g., the samples are unavailable for decoding the current block).

For example, if a face discontinuity is located above a current block, one or more of the reconstructed samples from a top template and/or one or more of the reference samples located above the top template may be located on the other side of the face discontinuity that the current block adjoins. The top template may be discarded in a DIMD search.

For example, if a face discontinuity is located on the left side of a current block, then one or more of the reconstructed samples from a left template and/or one or more of the reference samples located on the left side of the left template may be located on the other side of the face discontinuity that the current block adjoins. The left template may be discarded in a DIMD search.

Reconstructed samples that may be used to predict a template and which may be located on the other side of a face discontinuity that a current block adjoins may be) considered unavailable. This indication may be applied to templates and/or to the reference samples, which may be used to predict the templates. Reconstructed samples considered unavailable may be padded (e.g., padded using available reconstructed samples).

The reconstructed samples may be located on the other side of the face discontinuity that the current block adjoins. One or more spherical neighbors may be used instead of frame-packed neighbors. The spherical neighbors may be derived by unfolding the geometry and using the samples from adjacent faces. This may be referred to as face-based padding. For example, as shown in FIGS. 18A and 18B, the top template of block A may be derived from its spherical neighbor block E. Block D may not be used for padding if, for example, a face discontinuity exists between block A and block D.

DIMD may be disabled for a block based on the block's location relative to a face discontinuity. For example, DIMD may be disabled for one or more of the following: blocks whose samples in the top and left templates are not located in the same face to which the current block belongs, and/or blocks whose reference samples used to predict the top and left templates are not located in the same face to which the current block belongs.

Overlapped block motion compensation at face discontinuities may be performed. To avoid adjustment using inappropriate samples in OBMC, adjustment based on neighboring blocks (or sub-blocks) that are located on the other side of the face discontinuity which the current block (or sub-block) adjoins may be skipped. If a face discontinuity is located above the current block (or sub-block), the adjustment of the first rows of the current block (or sub-block) using the motion vector of the above block (or sub-block), which is located on the other side of the face discontinuity, may be skipped. If a face discontinuity is located below the current block (or sub-block), the adjustment of the last rows of the current block (or sub-block) using the motion vector of the below block (or sub-block), which is located on the other side of the face discontinuity, may be skipped. If a face discontinuity is located on the left side of the current block (or sub-block), the adjustment of the first columns of the current block (or sub-block) using the motion vector of the left block (or sub-block), which is located on the other side of the face discontinuity, may be skipped. If a face discontinuity is located on the right side of the current block (or sub-block), the adjustment of the last columns of the current block (or sub-block) using the motion vector of the right block (or sub-block), which is located on the other side of the face discontinuity, may be skipped.

An adjustment of a block or sub-block may be skipped based on a face discontinuity crossing the block or sub-block. If, for example, a face discontinuity crosses a current block or sub-block, the adjustment of the block or sub-block boundaries that are crossed by a face discontinuity may be skipped. When a horizontal face discontinuity crosses the current block or sub-block, the adjustment of the first and/or last columns of the current block or sub-block may be skipped. When a vertical face discontinuity crosses the current block or sub-block, the adjustment of the first and/or last rows of the current block or sub-block may be skipped.

A boundary of a block or sub-block may be crossed by a face discontinuity. If a boundary of the current block or sub-block is crossed by a face discontinuity, OBMC may be applied. For example, OBMC may be applied separately for a part (e.g., each part) of a block boundary, which may be located on a side (e.g., each side) of the face discontinuity, e.g. considering the corresponding neighboring MVs located in the same face as a boundary segment (e.g., each boundary segment).

Groups of sub-blocks may present similar (e.g., the same) motion information. OBMC may be applied (e.g., directly) to a group of sub-blocks (e.g., an entire group of sub-blocks), for example, if the sub-blocks present the same motion information, as illustrated in FIGS. 21(a)-(b).

Figure 24B:
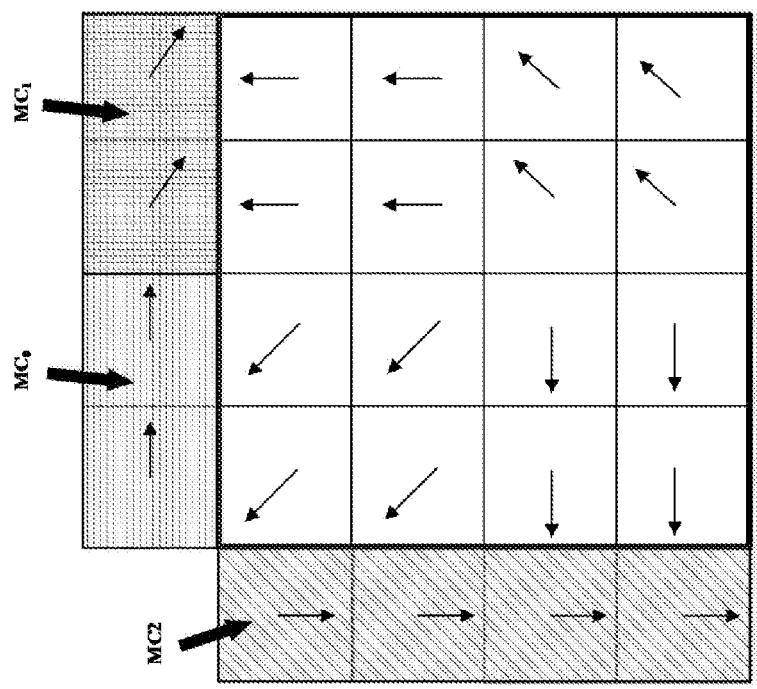
FIG. 24 illustrates an example comparison of an external overlapped block motion compensation (OBMC)-based motion compensation based on: (a) an OBMC design, (b) a row/column based sub-block merging, and (c) sub-block merging near face discontinuities.
Figure 24A:
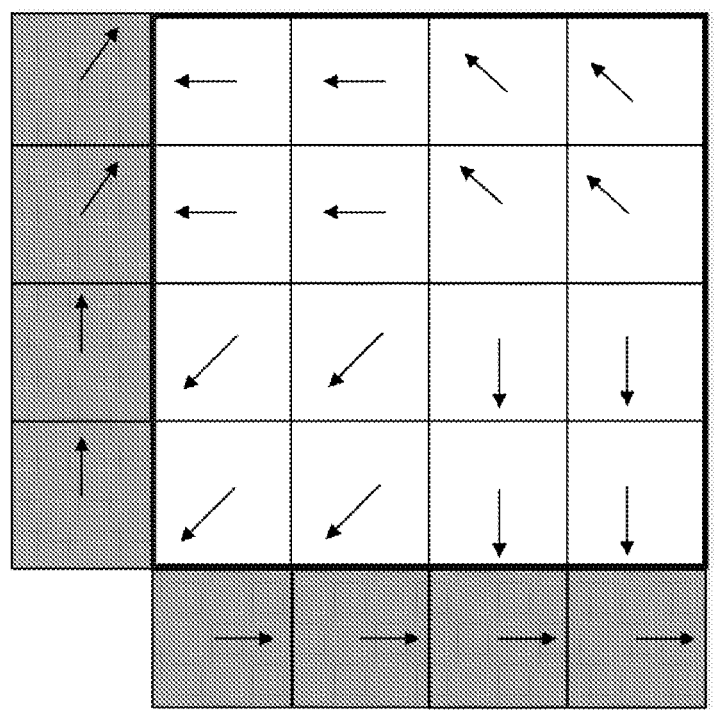
Figure 24C:
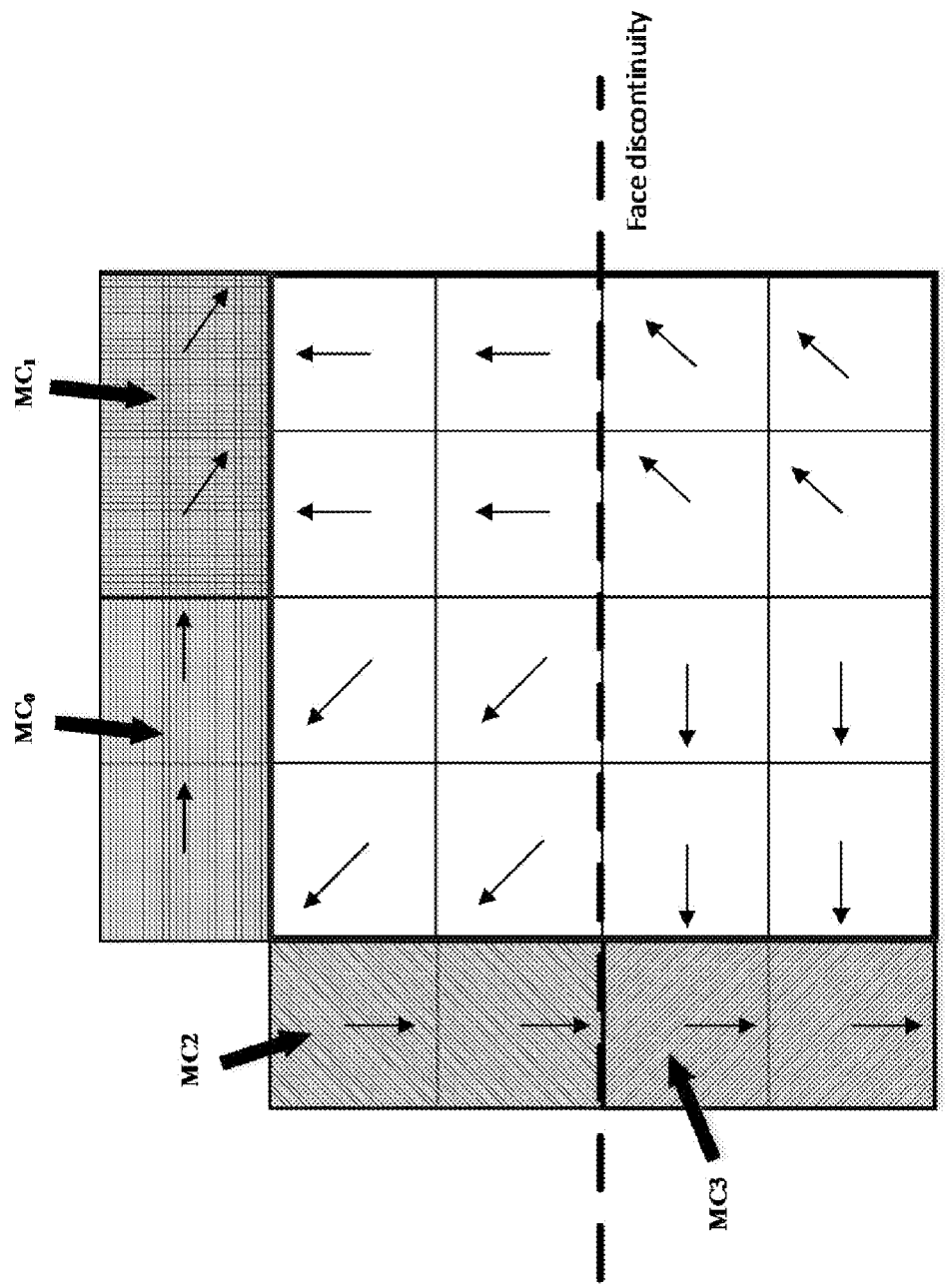

Sub-blocks may be merged into one or more larger sub-block-groups based on their locations relative to a face discontinuity. If one or more sub-blocks are merged into a larger sub-block-group, the sub-blocks (e.g., only the sub-blocks) that belong to the same face may be merged together. For example, if a block is crossed by a horizontal face discontinuity and the sub-blocks (e.g., all the sub-blocks) on the left side of the block have the same motion information, the adjacent sub-blocks may be grouped together (e.g., into two groups). The adjacent sub-blocks that are grouped together may be used to perform external OBMC-based motion compensations. As seen in FIG. 24(c), these sub-block-groups may correspond to motion compensations (e.g., MC2 and MC3, in FIG. 24 (c)). As seen in FIG. 24(c), a group may be located on a side of a face discontinuity.

OBMC-based motion compensations may be applied considering the face to which the sub-blocks belong. If, for example, geometry padding is performed, the OBMC-based motion compensations may be applied using the corresponding padded face. OBMC may be disabled for groups and/or sub-blocks based on their location relative to a face discontinuity. For example, OBMC may be disabled for groups and/or sub-blocks that belong to a different face than that of the current block's top-left position. In the example depicted in FIG. 24 (c), OBMC-based motion compensation (e.g., MC3 in FIG. 24 (c)) may be disabled.

OBMC may use the MVs of neighboring blocks or sub-blocks to perform motion compensation on the current block or sub-block. When a neighboring MV comes from a different face than the current block or sub-block, OBMC may be disabled for that MV. OBMC may combine one or more prediction signals using the neighboring MVs to generate a final prediction signal of the current block. If the prediction signal generated using a neighboring MV uses samples from a different face than that of the current block or sub-block, OBMC may be disabled for that MV.

For example, a block or sub-block may be located below a face discontinuity. A left boundary of the block or sub-block may be adjusted. If the prediction signal is generated using a left neighboring motion vector (e.g., which may come from the same face as the current block or sub-block) and/or uses samples from above the face discontinuity, OBMC may be disabled for the left block or sub-block boundary.

In examples, OBMC for blocks (or sub-blocks) that are located next to a face discontinuity may be disabled (e.g., completely disabled). In examples, OBMC for blocks (or sub-blocks) that are crossed by a face discontinuity may be disabled (e.g., completely disabled).

A deblocking filter may be applied at face discontinuities.

Deblocking of the block boundaries that are within the proximity of a face discontinuity may be skipped when one or more (e.g., all) samples used in a deblocking filter are not located on the same side of the face discontinuity. For example, if a vertical block boundary is within the proximity of a vertical face discontinuity such that one or more (e.g., all) samples used in the deblocking filter are not located on the same side of the face discontinuity, the deblocking filter may be disabled across this block boundary. If a horizontal block boundary is within the proximity of a horizontal face discontinuity such that one or more (e.g., all) samples used in the deblocking filter are not located on the same side of the face discontinuity, the deblocking filter may be disabled across this block boundary.

A sample adaptive offset (SAO) filter may be applied at face discontinuities. One or more categories in edge offset mode in SAO for which the samples used in gradient computations are on two different sides of a face discontinuity may be disabled. For example, if a face discontinuity is located above or below a current sample position, the vertical and two diagonal categories may be disabled for that sample position. If a face discontinuity is located on the left side of or on the right side of the current sample position, the horizontal and two diagonal categories may be disabled for that sample position. In examples, the edge offset mode in SAO may be disabled (e.g., completely disable) for samples that are located next to a face discontinuity.

An adaptive loop filter (ALF) may be applied at face discontinuities. ALF may skip sample locations where the largest filter crosses a face discontinuity. For example, ALF may skip sample locations where the samples used in the filtering process are on two different sides of a face discontinuity. For the luma component, which may use up to a 9×9 diamond filter (e.g., see FIG. 16(c)), ALF may be disabled for samples located within four samples of a face discontinuity. For the chroma components, which may use (e.g., only use) a 5×5 diamond filter (e.g., see FIG. 16(a)), ALF may be disabled for samples located within two samples of a face discontinuity.

In examples, ALF may be disabled (e.g., completely disabled) for blocks that are located next to a face discontinuity and/or for blocks that include a face discontinuity. Disabling ALF may allow a decoder to perform a determination (e.g., of whether ALF is on or off) at the block level. ALF may be adapted (e.g., turned on/off) at the picture-level and/or block-level. ALF may be turned off for a given block, for example when the block is affected by a face discontinuity (e.g., the block is crossed by a face discontinuity or is adjacent to a face discontinuity). Block-level signaling may be skipped for the block, and ALF may be inferred to be off for that block.

The ALF classification process may skip one or more sample locations and/or blocks of sample locations where ALF filtering may be disabled. For example, the ALF classification may skip a sample location because the sample location is affected by a face discontinuity (e.g., the samples used in the classification process at that sample location are on two different sides of a face discontinuity). ALF classification may skip a block if one or more samples within the block are affected by a face discontinuity. ALF classification may be performed on 2×2 block units.

Figure 25A:
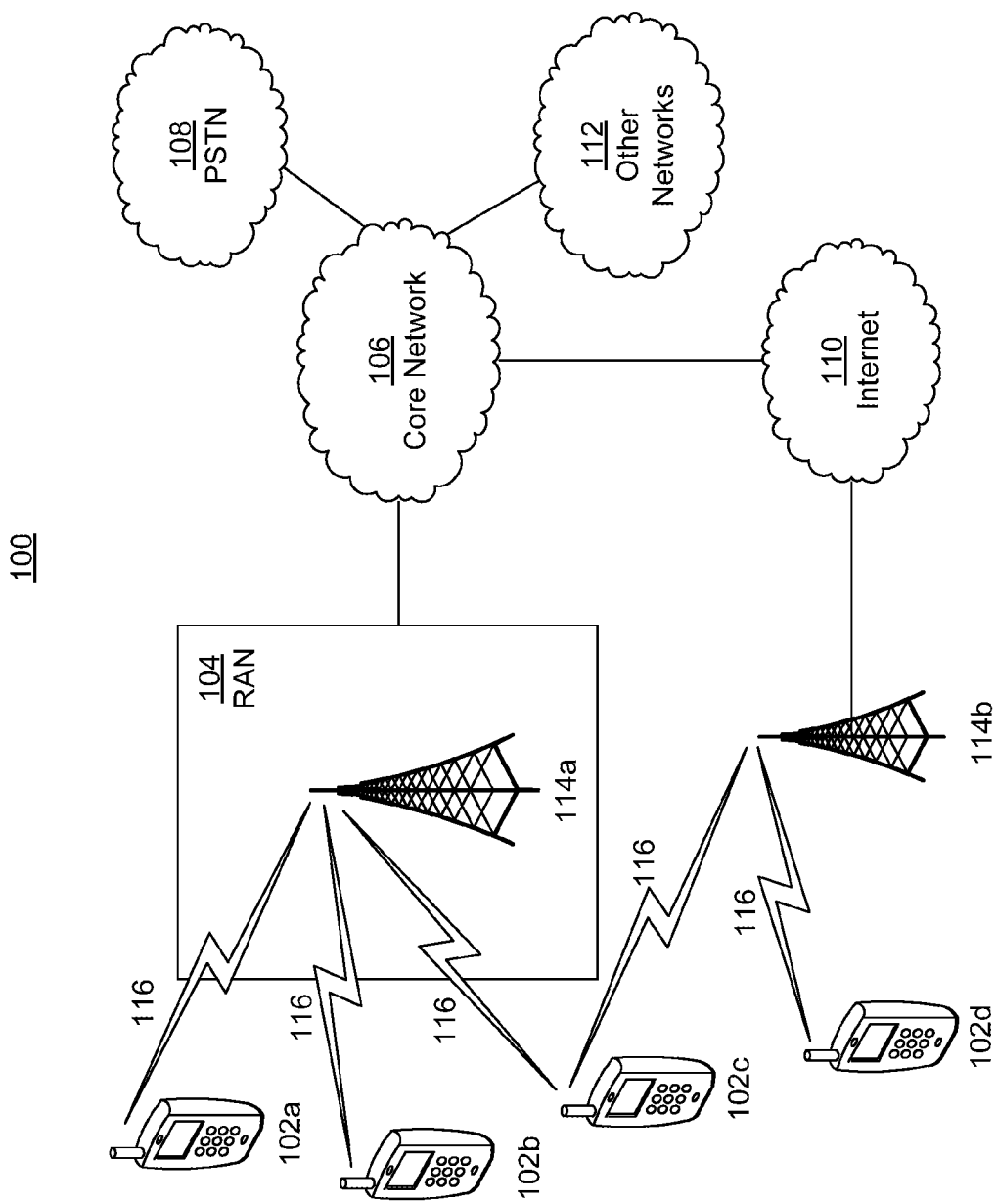
FIG. 25A is a system diagram illustrating an example communications system in which one or more disclosed embodiments may be implemented.

FIG. 25A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 25A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 1061115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc.

The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b. 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 25A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 25A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling. Internet connectivity, video distribution, etc., and/or perform high-level security functions, such as user authentication. Although not shown in FIG. 25A, it will be appreciated that the RAN 104/113 and/or the CN 106/115 may be in direct or indirect communication with other RANs that employ the same RAT as the RAN 1041113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 25A may be configured to communicate with the base station 114a, which may employ a cellular-based radio technology, and with the base station 114b, which may employ an IEEE 802 radio technology.

Figure 25B:
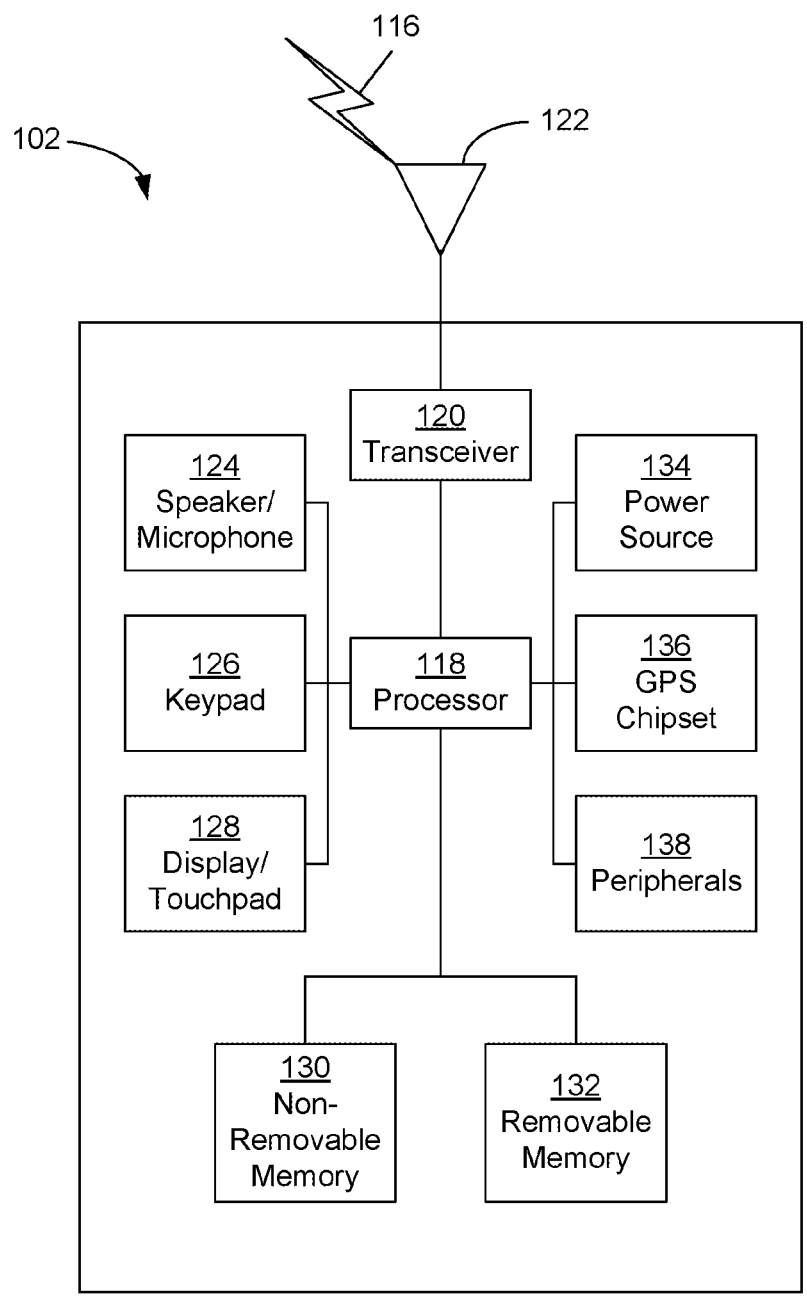
FIG. 25B is a system diagram illustrating an example wireless transmit/receive unit (WTRU) that may be used within the communications system illustrated in FIG. 25A according to an embodiment.

FIG. 25B is a system diagram illustrating an example WTRU 102. As shown in FIG. 25B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 25B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 25B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 25C:
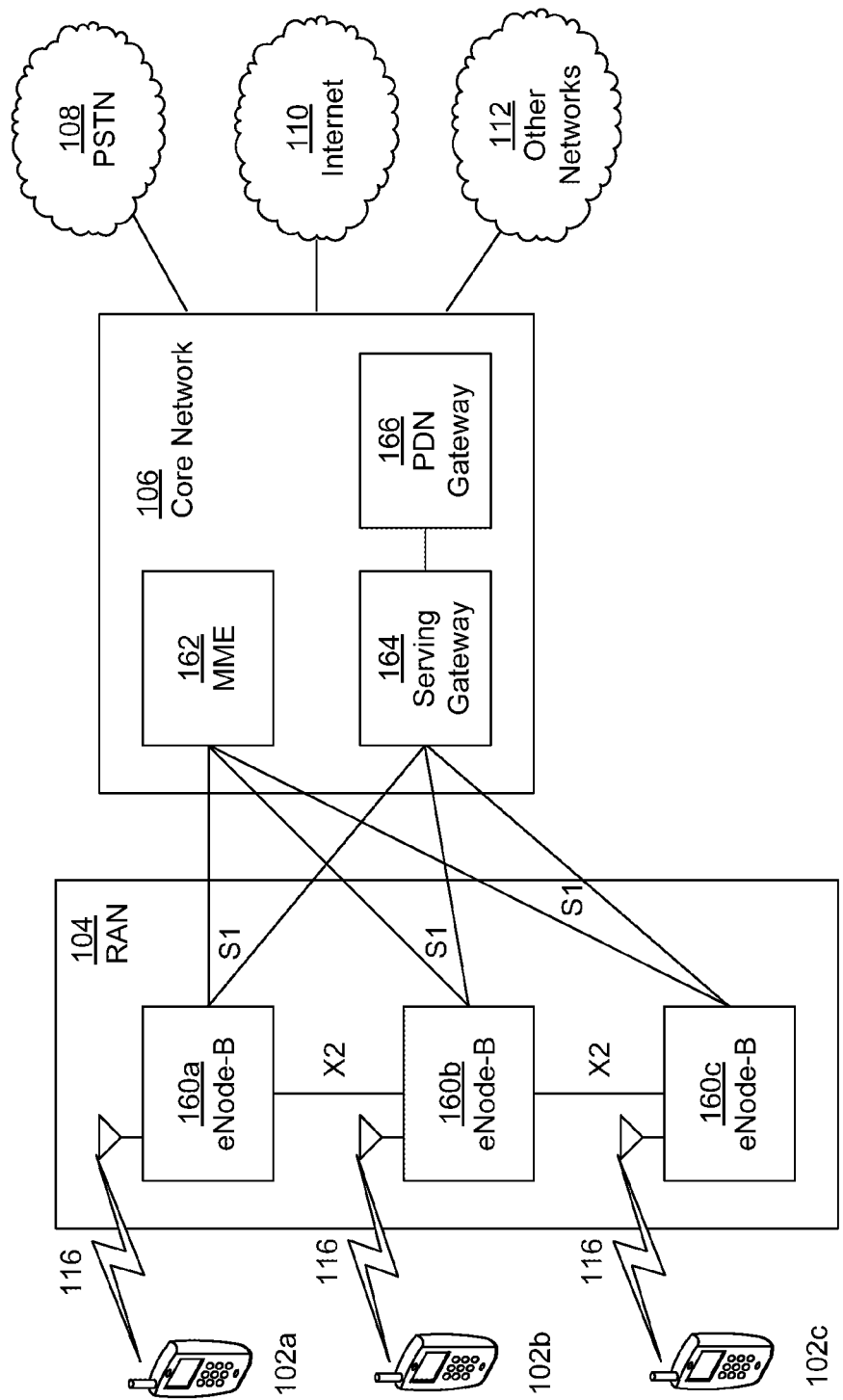
FIG. 25C is a system diagram illustrating an example radio access network (RAN) and an example core network (CN) that may be used within the communications system illustrated in FIG. 25A according to an embodiment.

FIG. 25C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 25C, the eNode-Bs 160a, 160b, 160c may communicate with one another over an X2 interface.

The CN 106 shown in FIG. 25C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a. 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 20A-D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac, 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 25D:
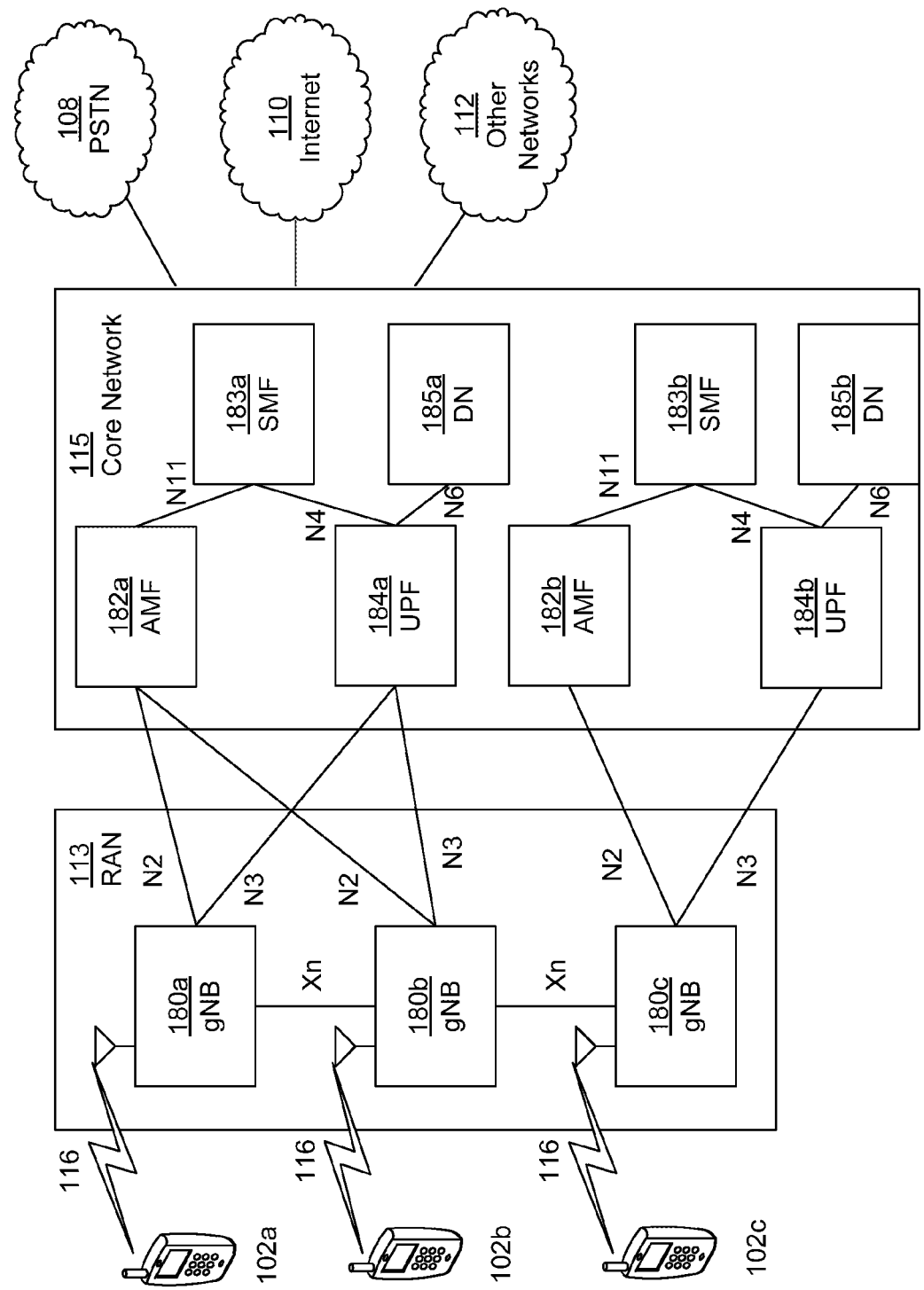
FIG. 25D is a system diagram illustrating a further example RAN and a further example CN that may be used within the communications system illustrated in FIG. 25A according to an embodiment.

FIG. 25D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b. 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 25D, the gNBs 180a, 180b, 180c may communicate with one another over an Xn interface.

The CN 115 shown in FIG. 25D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIG. 25A-D, and the corresponding description of FIG. 25 A-1D, one or more, or all, of the functions described herein with regard to one or more of WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented/and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method comprising:
   obtaining at least a syntax element configured to indicate a number of discontinuous face boundaries in a picture; and
   for each discontinuous face boundary in the picture:
      obtaining a discontinuous face boundary position indicator configured to indicate a position along an axis that is associated with the discontinuous face boundary between two discontinuous faces in the picture, wherein the picture represents a 360 degree picture and comprises a frame-packed picture having a plurality of faces,
      based on the obtained discontinuous face boundary position indicator, determining the position of the discontinuous face boundary between the two discontinuous faces in the picture, and
      disabling loop filtering across the determined position of the discontinuous face boundary between the two discontinuous faces in the picture.

2. The method of claim 1, wherein the discontinuous face boundary position indicator is configured to indicate a start position and an end position of at least one discontinuous face boundary.

3. The method of claim 1, wherein the discontinuous face boundary position indicator comprises at least one of a vertical discontinuous face boundary position indicator or a horizontal discontinuous face boundary position indicator, wherein the vertical discontinuous face boundary position indicator is configured to indicate a position along a horizontal axis that is associated with a vertical discontinuous face boundary in the picture, and wherein the horizontal discontinuous face boundary position indicator is configured to indicate a position along a vertical axis that is associated with a horizontal discontinuous face boundary in the picture.

4. The method of claim 1, wherein a face boundary between two faces in the picture is discontinuous if the two faces do not share a same edge in a 3D geometry.

5. The method of claim 1, wherein the discontinuous face boundary indicator is obtained at a sequence parameter set (SPS) level.

6. The method of claim 1, wherein the loop filtering comprises at least one of adaptive loop filter (ALF), deblocking filter, or sample adaptive offset (SAO) filter.

7. An apparatus comprising:
a processor configured to:
obtain at least a syntax element configured to indicate a number of discontinuous face boundaries in a picture; and
for each discontinuous face boundary in the picture:
obtain a discontinuous face boundary position indicator configured to indicate a position along an axis that is associated with the discontinuous face boundary between two discontinuous faces in the picture, wherein the picture represents a 360 degree picture and comprises a frame-packed picture having a plurality of faces,
based on the obtained discontinuous face boundary position indicator, determine the position of the discontinuous face boundary between the two discontinuous faces in the picture, and
disable loop filtering across the determined position of the discontinuous face boundary between the two discontinuous faces in the picture.

8. The apparatus of claim 7, wherein the discontinuous face boundary position indicator is configured to indicate a start position and an end position of at least one discontinuous face boundary.

9. The apparatus of claim 7, wherein the discontinuous face boundary position indicator comprises at least one of a vertical discontinuous face boundary position indicator or a horizontal discontinuous face boundary position indicator, wherein the vertical discontinuous face boundary position indicator is configured to indicate a position along a horizontal axis that is associated with a vertical discontinuous face boundary in the picture, and wherein the horizontal discontinuous face boundary position indicator is configured to indicate a position along a vertical axis that is associated with a horizontal discontinuous face boundary in the picture.

10. The apparatus of claim 7, wherein a face boundary between two faces in the picture is discontinuous if the two faces do not share a same edge in a 3D geometry.

11. The apparatus of claim 7, wherein the discontinuous face boundary indicator is obtained at a sequence parameter set (SPS) level.

12. The apparatus of claim 7, wherein the loop filtering comprises at least one of adaptive loop filter (ALF), deblocking filter, or sample adaptive offset (SAO) filter.

* * * * *